US008047942B2

(12) United States Patent
Ueda et al.

(10) Patent No.: US 8,047,942 B2
(45) Date of Patent: Nov. 1, 2011

(54) SPEED CHANGE TRANSMISSION APPARATUS

(75) Inventors: Yoshihiro Ueda, Sakai (JP); Yoshiyuki Katayama, Osaka (JP); Shinichi Morita, Sakai (JP)

(73) Assignee: Kubota Corporation, Osaka (JP)

( * ) Notice: Subject to any disclaimer, the term of this patent is extended or adjusted under 35 U.S.C. 154(b) by 651 days.

(21) Appl. No.: 12/067,457

(22) PCT Filed: Mar. 19, 2007

(86) PCT No.: PCT/JP2007/055539
§ 371 (c)(1),
(2), (4) Date: Aug. 8, 2008

(87) PCT Pub. No.: WO2008/004360
PCT Pub. Date: Jan. 10, 2008

(65) Prior Publication Data
US 2009/0270212 A1 Oct. 29, 2009

(30) Foreign Application Priority Data

Jul. 6, 2006 (JP) .................................. 2006-186982
Jul. 25, 2006 (JP) .................................. 2006-202197
Sep. 13, 2006 (JP) .................................. 2006-248160

(51) Int. Cl.
*F16H 47/04* (2006.01)
(52) U.S. Cl. ............................................... 475/79
(58) Field of Classification Search .................. None
See application file for complete search history.

(56) References Cited

U.S. PATENT DOCUMENTS

| 5,403,241 | A | * | 4/1995 | Jarchow et al. | 475/72 |
| 5,605,515 | A | * | 2/1997 | Fredriksen | 475/76 |
| 5,643,121 | A | | 7/1997 | Greenwood et al. | |
| 5,980,411 | A | * | 11/1999 | Wontner | 475/76 |
| 7,063,638 | B2 | * | 6/2006 | Weeramantry | 475/74 |
| 7,530,913 | B2 | * | 5/2009 | Fabry et al. | 475/82 |

FOREIGN PATENT DOCUMENTS

| CN | 1120860 A | 4/1996 |
| EP | 0302188 A1 | 2/1989 |
| JP | 5623070 B2 | 5/1981 |
| JP | 5738832 B2 | 8/1982 |
| JP | 612098 Y2 | 1/1986 |

* cited by examiner

*Primary Examiner* — Dirk Wright
(74) *Attorney, Agent, or Firm* — The Webb Law Firm

(57) ABSTRACT

The apparatus includes a hydrostatic stepless speed change section 20 receiving an output of an engine 1, a planetary transmission section 3a having a plurality of planetary transmission mechanisms PF, PR and a plurality of output members 41, 42, the planetary transmission section being configured to combine a drive force outputted from the hydrostatic stepless speed change section 20 and an engine drive force that has not been subjected to any speed change action by the hydrostatic stepless speed change section 20, and a speed change output section 3b having an output shaft 70, the speed change output section being configured to output combined drives force outputted from the plurality of output members 41, 42 in a plurality of different speed ranges from the output shaft 70. The speed change output section 3b includes a plurality of transmission mechanisms 71-74 disposed between the plurality of output members 41, 42 and the output shaft 70, and clutches CL1-CL4 provided in correspondence with the respective plurality of transmission mechanisms.

16 Claims, 25 Drawing Sheets

Fig. 3

|  | first speed clutch (CL1) | second speed clutch (CL2) | third speed clutch (CL3) | fourth speed clutch (CL4) |
|---|---|---|---|---|
| low speed range (implement work range) — first speed range | ENGAGED | — | — | — |
| low speed range (implement work range) — second speed range | — | ENGAGED | — | — |
| high speed range (traveling range) — third speed range | — | — | ENGAGED | — |
| high speed range (traveling range) — fourth speed range | — | — | — | ENGAGED |

Fig. 8

|  | first clutch (CL1) | second clutch (CL2) | third clutch (CL3) | fourth clutch (CL4) |
|---|---|---|---|---|
| low speed range / first speed range | ENGAGED | — | — | — |
| second speed range | — | ENGAGED | — | — |
| high speed range / third speed range | — | — | ENGAGED | — |
| fourth speed range | — | — | — | ENGAGED |

Fig.12

|  | first clutch (CL1) | second clutch (CL2) | third clutch (CL3) | fourth clutch (CL4) |
|---|---|---|---|---|
| first speed range | ENGAGED | — | ENGAGED | — |
| second speed range | ENGAGED | ENGAGED | ENGAGED | — |
| third speed range | ENGAGED | ENGAGED | — | ENGAGED |
| fourth speed range | — | ENGAGED | — | ENGAGED |

Fig.23

| | output | acceleration | gear load | transmission efficiency |
|---|---|---|---|---|
| fourth mode | first, third speed range: carrier<br>second, fourth speed range: sun gear | first speed = second speed<br>third speed = fourth speed | intermediate | intermediate |
| fifth mode | first, third speed range: ring gear<br>second, fourth speed range: sun gear | first speed < second speed<br>third speed < fourth speed | small | low |
| sixth mode | first, third speed range: ring gear<br>second, fourth speed range: sun gear | first speed < second speed<br>third speed < fourth speed | intermediate | intermediate |
| seventh mode | first, third speed range: sun gear<br>second, fourth speed range: ring gear | first speed > second speed<br>third speed > fourth speed | large | high |

Fig.26

| | | first clutch (C1) | second clutch (C2) | low speed clutch (CL) | high speed clutch (CH) |
|---|---|---|---|---|---|
| low speed range | first speed range | ENGAGED | — | ENGAGED | — |
| | second speed range | — | ENGAGED | ENGAGED | — |
| high speed range | third speed range | ENGAGED | — | — | ENGAGED |
| | fourth speed range | — | ENGAGED | — | ENGAGED |

SPEED CHANGE TRANSMISSION APPARATUS

BACKGROUND OF THE INVENTION

The present invention relates to a speed change transmission apparatus including a hydrostatic stepless speed change section receiving an output of an engine, a planetary transmission section having a plurality of planetary transmission mechanisms and a plurality of output members, the planetary transmission section being configured to combine/synthesize a drive force outputted from the hydrostatic stepless speed change section and an engine drive force that has not been subjected to any speed change action by the hydrostatic stepless speed change section, and a speed change output section having an output shaft, the speed change output section being configured to output combined drives force outputted from the plurality of output members in a plurality of different speed ranges from the output shaft.

Next, in order to explain the advantage of the present invention, the construction of the invention filed for a patent application as Japanese Patent Application No. 2005-286073 and assigned to this applicant will be explained in comparison with the present invention. It should be noted; however, that the following discussion is not to be taken as this applicant's acknowledgement of the compared construction as prior art.

FIG. 24 is a diagram of a speed change transmission apparatus for comparison. As shown in this figure, the speed change transmission apparatus includes a hydrostatic stepless speed change section 20, a planetary transmission section 3a and a speed change output section 3b. The planetary transmission section 3a includes a first planetary transmission mechanism P1, a second planetary transmission mechanism P2 and a third planetary transmission mechanism P3. The first planetary transmission mechanism P1 includes a ring gear which receives an engine drive force not subjected to any speed change action by the hydraulic stepless speed change section 20 and a sun gear which receives the output from the hydraulic stepless speed change section 20. The second planetary transmission mechanism P2 includes a carrier operatively coupled to the ring gear of the first planetary transmission mechanism P1 and a ring gear operatively coupled to a carrier of the first planetary transmission mechanism P1. The third planetary transmission mechanism P3 includes a sun gear operatively coupled to a sun gear of the second planetary transmission mechanism P2 and a carrier operatively coupled to a ring gear of the second planetary transmission mechanism P2.

The speed change output section 3b includes a clutch section C which receives the output of the planetary transmission section 3a and an auxiliary speed change section 100 which receives the output of this clutch section C. The clutch section C includes a first clutch C1 and a second clutch C2 which have input portions thereof coupled respectively to a pair of output portions of the planetary transmission section 3a. The auxiliary speed change section 100 includes a low speed clutch CL and a high speed clutch CH disposed between an input shaft and an output shaft of this auxiliary speed change section 100.

FIG. 25 is an explanatory figure illustrating relationship among speed change conditions of the hydrostatic stepless speed change section 20, speed ranges and output speeds of the auxiliary speed change section 100 ("auxiliary speed change outputs" hereinafter) of the speed change transmission apparatus 3. The sign "−MAX" shown in FIG. 25 denotes the maximum speed change condition under a reverse rotation transmission condition of the hydrostatic stepless speed change section 20. The sign "N" denotes the neutral condition of the hydrostatic stepless speed change section 20. The sign "+MAX" denotes the maximum speed change condition under a forward rotation transmission condition of the hydrostatic stepless speed change section 20. FIG. 26 is an explanatory figure illustrating relationship between speed rages and operational conditions of the clutches of the speed change transmission apparatus 3. The sign "ENGAGED" shown in FIG. 26 represents engaged conditions of the respective clutches C1, C2, CL, CH. The sign "−" represents disengaged conditions of the respective clutches C1, C2, CL, CH.

When the first clutch C1 and the low speed clutch CL are operated to the engaged conditions and the hydrostatic stepless speed change section 20 is speed changed from "−MAX" toward "+MAX", the speed change transmission apparatus 3 is speed changed to the first speed range and the rotational speed of the auxiliary speed change output is increased steplessly from "0". When the hydrostatic stepless speed change section 20 reaches the speed condition "+MAX", the rotational speed of the auxiliary speed change output becomes "B11". In association with this, as the second clutch C2 and the low speed clutch CL are operated into the engaged conditions and the hydrostatic stepless speed change section 20 is decelerated from "+MAX", the speed change transmission apparatus 3 is speed changed into the second speed range and the rotational speed of the auxiliary speed change output is steplessly increased from "B11". When the hydrostatic stepless speed change section 20 is operated to a speed change condition 'A' which is between "+MAX" and "N", the rotational speed of the auxiliary speed change output becomes "B12". In association with this, as the first clutch C1 and the high speed clutch CH are operated into the engaged conditions and the hydrostatic stepless speed change section 20 is accelerated from "A", the speed change transmission apparatus 3 is speed changed into the third speed range and the rotational speed of the auxiliary speed change output is steplessly increased from "B12". When the hydrostatic stepless speed change section 20 reaches the speed condition "+MAX", the rotational speed of the auxiliary speed change output becomes "B13". In association with this, as the second clutch C2 and the high speed clutch CH are operated into the engaged conditions and the hydrostatic stepless speed change section 20 is speed changed toward "−MAX", the speed change transmission apparatus 3 is speed changed into the fourth speed range and the rotational speed of the auxiliary speed change output is steplessly increased from "B13". When the hydrostatic stepless speed change section 20 reaches the speed change condition "−MAX", the rotational speed of the auxiliary speed change output becomes the maximum speed "B14".

In the case of the speed change transmission apparatus described above, in the course of a speed change from one speed range to another speed range (this will be referred to as "range skipping speed change" hereinafter), especially in the course of switchover of the speed range between the second speed range and the third speed range, there sometimes occurs a momentary power transmission interruption or any other unstable speed change.

More particularly, the range skipping speed change where the speed range is switched over between the second speed range and the third speed range, is effected by switching over all clutches from one of the engaged and disengaged conditions to the other. Further, when there occurs a change in the drive load applied to the speed change transmission apparatus, thus leading to a change in the load applied to the clutch, even if a designed switchover operational force is applied to the clutch, there tends to occur a situation in which the clutch is switched over at a timing different from the designed timing. Further, the greater the number of clutches to be switched over, the greater the number of clutches which are switched over at different timings from the designed timings and the greater the difference in the switchover timings among the clutches. For this reason, in the course of the range skipping speed change where the speed range is switched over between the second speed range and the third speed range, during the period from the completion of switchover of the respective clutches into predetermined operational conditions and the switchover of the speed change output section to the operational condition for realizing the second speed range or the third speed range, a certain clutch may be kept under the disengaged condition for an extended period of time or kept under a slipping condition. Or, an unstable speed change operation may occur in which even after some clutches are operated into predetermined operational conditions, the other clutches have not yet been switched over to predetermined operational conditions, so that the speed change output section is operated into an operational condition for realizing the first speed range or the fourth speed range before being switched over to the operational condition for realizing the second speed range or the third speed range.

SUMMARY OF THE INVENTION

The object of the present invention is to provide a speed change transmission apparatus which can provide an engine output in a plurality of speed ranges and speed change the output steplessly in each speed range, yet which can readily avoid the above-described inconvenience in the course of speed change operation.

A speed change transmission apparatus according to a first characterizing construction of the present invention comprises:

a hydrostatic stepless speed change section receiving an output of an engine;

a planetary transmission section having a plurality of planetary transmission mechanisms and a plurality of output members, the planetary transmission section being configured to combine a drive force outputted from the hydrostatic stepless speed change section and an engine drive force that has not been subjected to any speed change action by the hydrostatic stepless speed change section; and a speed change output section having an output shaft, the speed change output section being configured to output combined drives force outputted from the plurality of output members in a plurality of different speed ranges from the output shaft;

wherein said speed change output section includes a plurality of transmission mechanisms disposed between said plurality of output members and said output shaft, and a clutch provided for each of the plurality of transmission mechanisms.

According to the construction of the first invention, with appropriate setting of the transmission ratios of the plurality of transmission mechanisms, the speed change output section can be configured such that for realizing a predetermined speed range, the plurality of clutches will be operated in such a manner as to operate one of the plurality of transmission mechanisms into the transmission engaged condition while operating another transmission mechanism into the transmission disengaged condition.

That is to say, if four transmission mechanisms and four clutches are provided in order to obtain four speed ranges, range skipping speed change operations may take place as a range skipping speed change operation between the first speed range and the second speed range, a range skipping speed change operation between the second speed range and the third speed range and a range skipping speed change operation between the third speed range and the fourth speed range. All of these operations are possible by switching over only certain two of the plurality of clutches.

With the above, it is possible to provide the engine output in a plurality of speed ranges and also to speed change the output steplessly in each speed range. Also, when any one of the range skipping speed change operations is to be effected, this is possible by switching over a small number of clutches. Moreover, there will hardly occur the momentary power transmission interruption or instable speed change noted above. And, when the construction is employed in a traveling transmission apparatus, smooth speed change traveling is possible even when the traveling drive load easily changes due to e.g. ground surface unevenness, so that it is possible to obtain a speed change transmission apparatus having high speed change performance and high output performance.

According to a second characterizing feature of the speed change transmission apparatus of the invention, output side rotational members of the clutches are supported on the output shaft of the speed change output section to be rotatable therewith. Therefore, when a drive load is applied from the same output shaft to the respective clutches and there occurs change in the drive load, the inconvenience of different switchover timings among the clutches will hardly occur.

With the above, it is possible to obtain a speed change transmission apparatus with which there will hardly occur the situation of the momentary power transmission interruption or instable speed change noted above.

According to a third characterizing feature of the speed change transmission apparatus of the invention, preferably, each one of the clutches is a multiple disc type friction clutch.

Further, according to a fourth characterizing feature of the speed change transmission apparatus of the invention, preferably, each one of the plurality of transmission mechanisms includes a pair of gears meshing with each other.

According to a fifth characterizing feature of the speed change transmission apparatus of the invention, said plurality of output members of the planetary transmission section include a sun gear output member rotatable in unison with a sun gear of the planetary transmission mechanism which is disposed on the most downstream side in the transmission direction of the planetary transmission section, a carrier output member rotatable in unison with a carrier of said most downstream side planetary transmission mechanism, and a ring gear output member rotatable in unison with a ring gear of said most downstream side planetary transmission mechanism.

With the fifth characterizing feature of the invention, when a certain clutch of the plurality of clutches corresponding to a certain speed range is switched into the engaged condition, an appropriate transmission mechanism of the plurality of transmission mechanisms in the speed change output section is rendered into the transmission engaged condition, so that the speed change output section will provide a predetermined speed range by operatively coupling an appropriate one of the sun gear output member, the carrier output member and the ring gear output member of the planetary transmission section to the output rotational member. Therefore, even with a simple planetary transmission section having no planetary transmission mechanisms or brakes, with appropriate switchovers of the plurality of clutches of the speed change output section in accordance with a speed change operation of the hydrostatic stepless speed change section, with the output combining/synthesizing by the planetary transmission section and the division of the combined/synthesized drive force by the speed change output section into a plurality of ranges, the engine output will be outputted in a plurality of speed ranges and speed changed steplessly in each speed range.

Therefore, the construction of the speed change output section can be simplified.

According to a sixth characterizing feature of the present invention, the sun gear output member, the carrier output member and the ring gear output member configured as a triple shaft construction parallel to the rotational axis of the output shaft; and the plurality of transmission mechanisms are arranged along the direction of the rotational axis of the output shaft.

Therefore, in terms of the layout/arrangement of the sun gear output member, the carrier output member and the ring gear output member as well as the layout arrangement of the plurality of transmission mechanisms, the speed change transmission apparatus can be formed compact.

According to a seventh characterizing feature of the present invention, a speed change transmission apparatus comprises:

a hydrostatic stepless speed change section receiving an output of an engine;

a planetary transmission section having a pair of output members, the planetary transmission section being configured to combine a drive force outputted from the hydrostatic stepless speed change section and an engine drive force that has not been subjected to any speed change action by the hydrostatic stepless speed change section and output the combined force from said pair of output members; and a speed change output section configured to output combined drives force outputted from the pair of output members in a plurality of speed ranges;

said planetary transmission section including:

a first planetary transmission mechanism having a first sun gear, a first ring gear and a first carrier and configured to receive the output from said hydrostatic stepless speed change section and the engine drive force that has not been subjected to any speed change action by the hydrostatic stepless speed change section; and a second planetary transmission mechanism having a second sun gear, a second ring gear and a second carrier and configured to receive output from said first planetary transmission mechanism;

said second sun gear of said second planetary transmission mechanism is operatively coupled to one of said pair of output members and either one of said second carrier and said second ring gear of said second planetary transmission mechanism is operatively coupled to the other of said pair of output members.

According to the speed change transmission apparatus having the seventh characterizing feature of the invention, the engine drive force and the output from the hydrostatic stepless speed change section are combined by the first planetary transmission mechanism and the second planetary transmission mechanism and this combined drive force is transmitted to the speed change output section. Hence, with a speed change operation at the hydrostatic stepless speed change section and an appropriate operation of the speed change output section associated therewith, the force is provided in a predetermined speed range. So, the engine drive force is outputted in a plurality of speed ranges and speed changed steplessly in each speed range and outputted as such.

With the above it is possible to obtain a speed change transmission apparatus capable of outputting an engine drive force in a plurality of speed ranges and speed changing the force steplessly in each speed range. Moreover, this can be obtained inexpensively as one having a simple construction including only a pair of first and second planetary transmission mechanisms as the planetary transmission mechanisms.

According to one variation of the construction of the seventh characterizing feature of the invention, the output from the hydrostatic stepless change speed section is inputted to the first sun gear of the first planetary transmission mechanism and the engine drive force that has not been subjected to any speed change action by the hydrostatic stepless speed change section is inputted to the first carrier; and the second ring gear of the second planetary transmission mechanism is operatively coupled to the first sun gear of the first planetary transmission mechanism to be rotatable in unison therewith, the second sun gear is operatively coupled to the first ring gear of the first planetary transmission mechanism to be rotatable in unison therewith, and the second carrier of the second planetary transmission mechanism is operatively coupled to the other of the pair of output members.

According to another variation of the construction of the seventh characterizing feature of the invention, the output from the hydrostatic stepless change speed section is inputted to the first ring gear of the first planetary transmission mechanism and the engine drive force that has not been subjected to any speed change action by the hydrostatic stepless speed change section is inputted to the first carrier; and the second sun gear of the second planetary transmission mechanism is operatively coupled to the first sun gear of the first planetary transmission mechanism to be rotatable in unison therewith, the second carrier is operatively coupled to the first carrier of the first planetary transmission mechanism to be rotatable in unison therewith, and the second ring gear of the second planetary transmission mechanism is operatively coupled to the other of the pair of output members.

According to still another variation of the construction of the seventh characterizing feature of the invention, the output from the hydrostatic stepless change speed section is inputted to the first sun gear of the first planetary transmission mechanism and the engine drive force that has not been subjected to any speed change action by the hydrostatic stepless speed change section is inputted to the first carrier, and the second carrier of the second planetary transmission mechanism is operatively coupled to the first carrier of the first planetary transmission mechanism to be rotatable in unison therewith, the second sun gear is operatively coupled to the first ring gear of the first planetary transmission mechanism to be rotatable in unison therewith, and the second carrier of the second planetary transmission mechanism is operatively coupled to the other of the pair of output members.

According to still another variation of the construction of the seventh characterizing feature of the invention, the output from the hydrostatic stepless change speed section is inputted to the first sun gear of the first planetary transmission mechanism and the engine drive force that has not been subjected to any speed change action by the hydrostatic stepless speed change section is inputted to the first carrier; and the second carrier of the second planetary transmission mechanism is operatively coupled to the first carrier of the first planetary transmission mechanism to be rotatable in unison therewith, the second ring gear is operatively coupled to the first ring gear of the first planetary transmission mechanism to be rotatable in unison therewith, and the second ring gear of the second planetary transmission mechanism is operatively coupled to the other of the pair of output members.

Further, preferably, said pair of output members include a shaft and a cylindrical shaft through which said shaft extends.

BRIEF DESCRIPTION OF THE DRAWINGS

FIG. 3 is an explanatory figure illustrating relationship between operational conditions of clutches and operational conditions of the speed change output section, FIG. 8 is an explanatory figure illustrating relationship between operational conditions of clutches and operational conditions of the speed change output section in the speed change transmission apparatus according to Embodiment 2, FIG. 12 is an explanatory figure illustrating relationship between operational conditions of clutches and speed ranges, FIG. 23 is an explanatory figure showing characteristics of the speed change transmission apparatuses according to Embodiment 4 through Embodiment 7, FIG. 26 is an explanatory figure illustrating relationship between operational conditions of clutches and operational conditions of a speed change output section of the speed change transmission apparatus to be compared with the present invention.

DETAILED DESCRIPTION OF PREFERRED EMBODIMENTS

Next, a plurality of embodiments of the present invention will be described with reference to the accompanying drawings. It should be understood that a combination of a feature described in one embodiment and a feature described in other embodiments would fall within the scope of the present invention.

Embodiment 1

Figure 1:
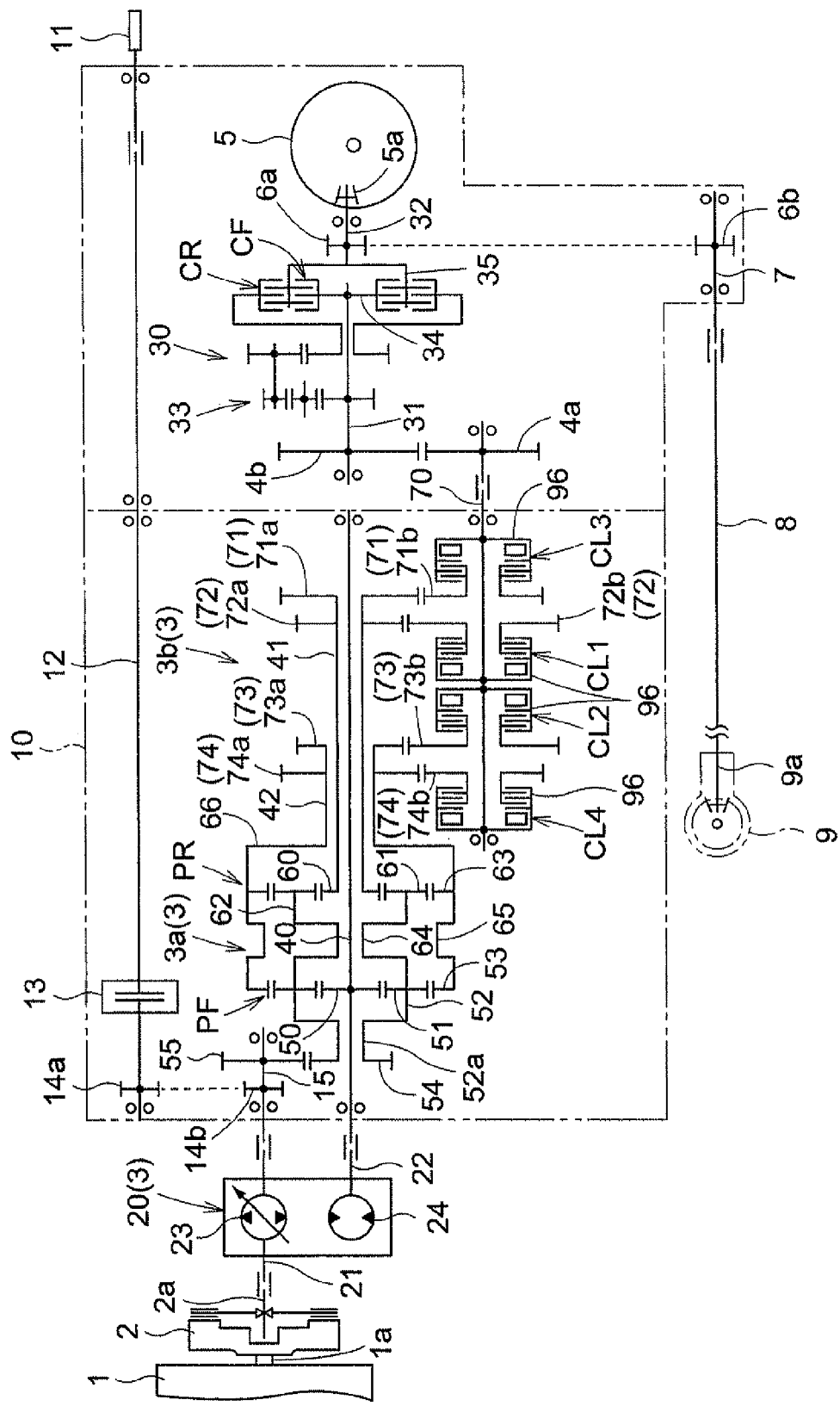
FIG. 1 is a diagram of a traveling transmission apparatus for a tractor.

FIG. 1 is a diagram of a speed change transmission apparatus according to Embodiment 1. The speed change transmission apparatus according to Embodiment 1 is mounted in a traveling transmission apparatus included in a work vehicle such as a tractor.

The traveling transmission apparatus includes a main clutch 2 receiving output from an output shaft 1a of an engine 1, the speed change transmission apparatus 3 having an input shaft 21 operatively coupled to an output shaft 2a of the main clutch 2, a forward/reverse switchover device 30 having an input shaft 31 operatively coupled via transmission gears 4a, 4b to an output shaft 70 of the speed change transmission apparatus 3, a rear wheel differential mechanism 5 having an input gear 5a operatively coupled to an output shaft 32 of this forward/reverse switchover device 30, a front wheel output shaft 7 operatively coupled, via transmission gears 6a, 6b, to the output shaft 32 of the forward/reverse switchover device 30, and a front wheel differential mechanism 9 having an input shaft 9a operatively coupled, via a transmission shaft 8 to this front wheel output shaft 7.

Incidentally, as shown in FIG. 1, a power takeoff (PTO) shaft 11 provided at a rear portion of a transmission case 10 is used for transmitting the drive force of the engine 1 to various utility implements such as a rotary plow (not shown) connected to a rear portion of the body of the tractor. This PTO shaft 11 is operatively coupled to the input shaft 21 of the speed change transmission apparatus 3 via a transmission shaft 12, an implement clutch 13, transmission gears 14a, 14b and a rotation support shaft 15 of the transmission gear 14b. In other embodiments, the transmission gear 14b is denoted with other reference numerals such as 114b, 214b, etc.

As shown in FIG. 1, the speed change transmission apparatus 3 includes a hydrostatic stepless speed change section 20 (in the following discussion, this will be referred to as "stepless speed change section 20" for short), having a pump shaft provided as the input shaft 21 (in the following discussion, the input shaft 21 will be referred to as the pump shaft 21), a planetary transmission section 3a having a pair of planetary transmission mechanisms PF, PR, and a speed change output section 3b having the output shaft 70. The stepless speed change section 20 is provided outside the transmission case 20, whereas the planetary transmission section 3a, the speed change output section 3b, the forward/reverse switchover device 30 and the rear wheel differential mechanism 5 are provided inside the transmission case 20.

The stepless speed change section 20 includes a hydraulic pump 23 having the pump shaft 21, and a hydraulic motor 24 driven by a pressure oil from this hydraulic pump 23. The hydraulic pump 23 is constructed as an axial plunger, variable displacement type hydraulic pump. The hydraulic motor 24 is constructed as an axial plunger type hydraulic motor.

That is, with the stepless speed change section 20 in operation, the output from the output shaft 1a of the engine 1 is inputted via the main clutch 2 to the pump shaft 21 and in response to a change in the swash plate slope of the hydraulic pump 23, the inputted engine drive force is converted into a drive force in the forward rotation direction and a drive force in the reverse rotation direction, and in either the forward rotation direction or the reverse rotation direction, the force is speed changed steplessly and outputted as such from the motor shaft 22.

The planetary transmission section 3a includes the pair of planetary transmission mechanisms PF, PR which are supported to front side portions of a single rotation support shaft 40 arranged along the fore-aft direction of the vehicle body, with the mechanisms PF, PR being juxtaposed along the direction of the axis of this rotation support shaft 40. In addition, the planetary transmission section 3a includes also a pair of cylindrical shaft type output portions 41, 42 provided as a double cylindrical shaft construction at a rear side portion of the rotation support shaft 40 and consisting of an inner cylindrical shaft and an outer cylindrical shaft rotatably fitted.

The front planetary transmission mechanism PF disposed on the forward side of the vehicle body of the pair of planetary transmission mechanisms PF, PR, includes a sun gear 50 supported on the rotation support shaft 40 to be rotatable in unison therewith, a plurality of planet gears 51 distributed along the outer periphery of this sun gear 50 and along the peripheral direction of the sun gear 50 and meshing the sun gear 50, a carrier 52 rotatably supporting the respective planet gears 51, and a ring gear 53 having inner teeth meshed with the respective planet gears 51. The sun gear 50 is operatively coupled via the rotation support shaft 40 to the motor shaft 22 to be rotatable in unison therewith. With the above construction, the output from the motor shaft 22 of the stepless speed change section 20 is transmitted to the sun gear 50. The carrier 52 is operatively coupled to the pump shaft 21 via a transmission gear 54 provided at an attaching cylindrical portion 52a of this carrier 22 to be rotatable therewith, a transmission gear 55 meshing with this transmission gear 54 and the rotation support shaft 15 acting also as a rotation support shaft of this transmission gear 55. With this, the engine drive force transmitted from the output shaft 1a of the engine 1 to the front end side of the pump shaft 21 and not subjected to any speed change action by the stepless speed change section 20 is transmitted to the carrier 52.

The rear planetary transmission mechanism PR disposed on the rear side of the vehicle body of the pair of planetary transmission mechanisms PF, PR, includes a sun gear 60 supported to a front end portion of the inner cylindrical shaft side output member 41 of the pair of output portions 41, 42 (in the following discussion, this will be referred to as the "first output member 41") to be rotatable therewith, a plurality of planet gears 61 distributed along the outer periphery of this sun gear 60 and along the peripheral direction of the sun gear 60 and meshing the sun gear 60, a carrier 62 rotatably supporting the respective planet gears 61, and a ring gear 63 having inner teeth meshed with the respective planet gears 61 As the sun gear 60 is supported to the first output member 41 to be rotatable in unison therewith, the sun gear 60 and the first output member 41 are operatively coupled to each other to be rotatable in unison. The carrier 62 is operatively coupled via a coupling member 64 to the carrier 52 of the front planetary transmission mechanism PF. The ring gear 63 is operatively coupled via a coupling member 65 to the ring gear 53 of the front planetary transmission mechanism PF. The ring gear 63 is operatively coupled via a coupling member 66 to a front end portion of the outer cylindrical shaft side output member 42 of the pair of output members 41, 42 (this will be referred to as the "second output member 42" hereinafter).

That is, with the planetary transmission section 3a in operation, the engine drive force outputted from the output shaft 1a of the engine 1 and not subjected to any speed change action by the stepless speed change section 20 and the drive force drive force outputted from the motor shaft 22 of the stepless speed change section 20 are combined/synthesized together and this combined/synthesized drive force is outputted from the first output member 41 and the second output member 42.

Figure 2:
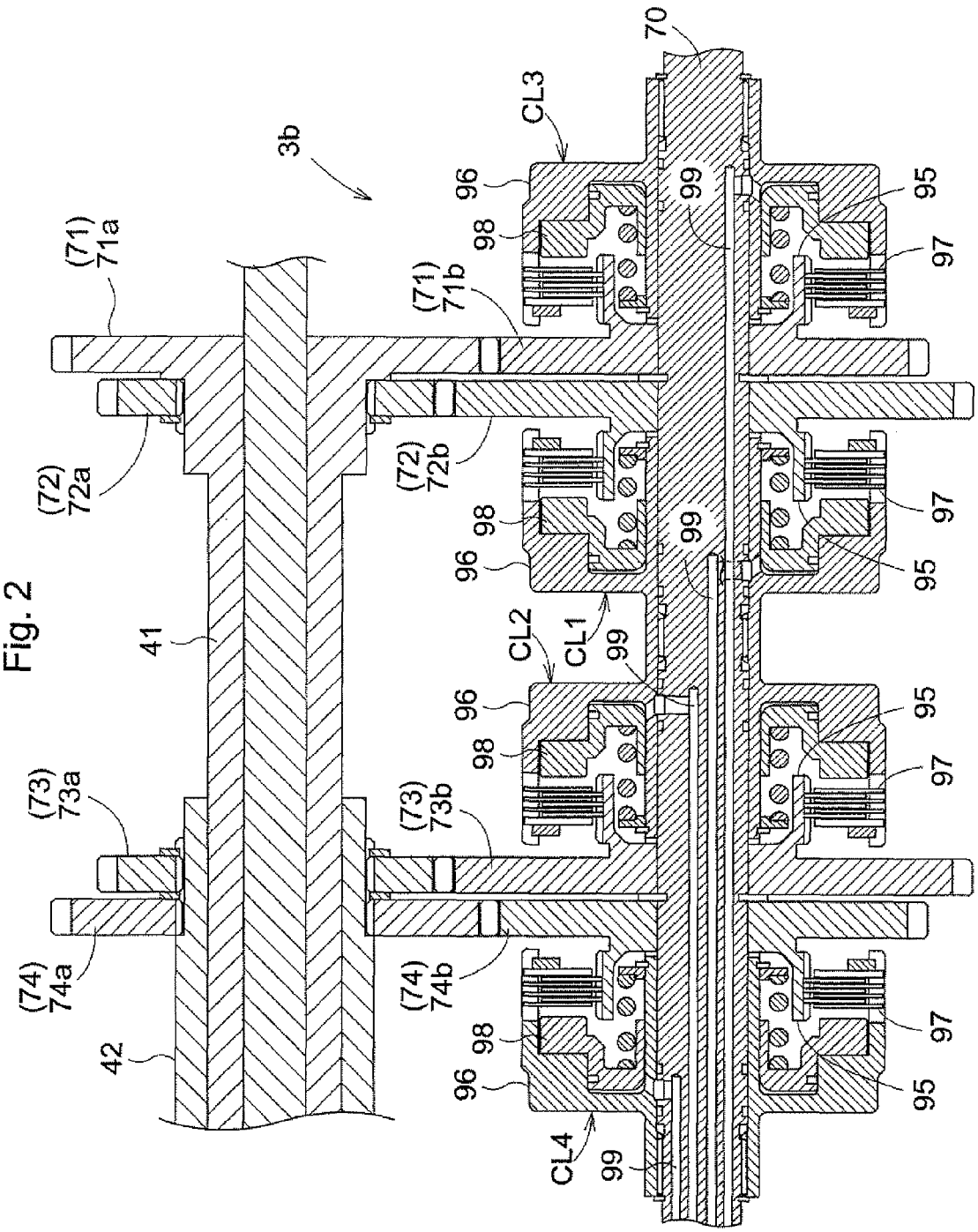
FIG. 2 is a section view of a speed change output section.

FIG. 2 is a section view of the speed change output section 3b. As shown in this figure, in addition to the output shaft 70, the speed change output section 3b further includes a pair of first transmission mechanisms 71, 72 provided between/across this output shaft 70 and the first output member 41, a pair of second transmission mechanisms 73, 74 provided between/across the output shaft 70 and the second output member 42, a pair of clutches CL1, CL3 provided respectively in the pair of first transmission mechanisms 71, 72 and a further pair of clutches CL2, CL4 provided respectively in the pair of second transmission mechanisms 73, 74.

Each first transmission mechanism 71, 72 includes an input gear 71a, 72a provided on the first output member 41 to be rotatable in unison therewith, and an output gear 71b, 72b rotatably mounted on the output shaft 70 and meshed with this input gear 71a, 72a. Each second transmission mechanism 73, 74 includes an input gear 73a, 74a provided on the second output member 42 to be rotatable in unison therewith, and an output gear 73b, 74b rotatably mounted on the output shaft 70 and meshed with this input gear 73a, 74a. The clutch CL1 through CL4 provided in the respective transmission mechanism 71 through 74 is provided between/across the output gear 71b, 72b, 73b, 74b and the output shaft 70. With each transmission mechanism 71-74 in operation, as the corresponding clutch CL1-CL4 is operated into the engaged condition, the drive force of the first output member 41 or the second output member 42 is transmitted via the input gear 71a, 72a, 73a, 74a and the output gear 71b, 72b, 73b, 74b to the output shaft 70. As the corresponding clutch CL1-CL4 is operated into the disengaged condition, the force transmission from the first output member 41 or the second output member 42 to the output shaft 70 is stopped. The pair of first transmission mechanisms 71, 72 are provided with mutually differing transmission ratios so that the rotational speed of the output shaft 70 when the one first transmission mechanism 71 transmits the drive force of the first output member 41 to the output shaft 70 may be higher than the rotational speed of the output shaft 70 when the other first transmission mechanism 72 outputs the drive force of the first output member 41 to the output shaft 70. The pair of second transmission mechanisms 73, 74 are provided with mutually differing transmission ratios so that the rotational speed of the output shaft 70 when the one second transmission mechanism 73 transmits the drive force of the second output member 42 to the output shaft 70 may be lower than the rotational speed of the output shaft 70 when the other second transmission mechanism 74 outputs the drive force of the second output member 42 to the output shaft 70.

In the following discussion, the clutch CL3 included in the one first transmission mechanism 71 will be referred to as the third speed clutch CL3, the clutch CL1 included in the other first transmission mechanism 72 will be referred to as the first speed clutch CL1, the clutch CL2 included in the one second transmission mechanism 73 will be referred to as the second speed clutch CL2, and the clutch CL4 included in the other second transmission mechanism 74 will be referred to as the fourth speed clutch CL4, respectively.

Figure 4:
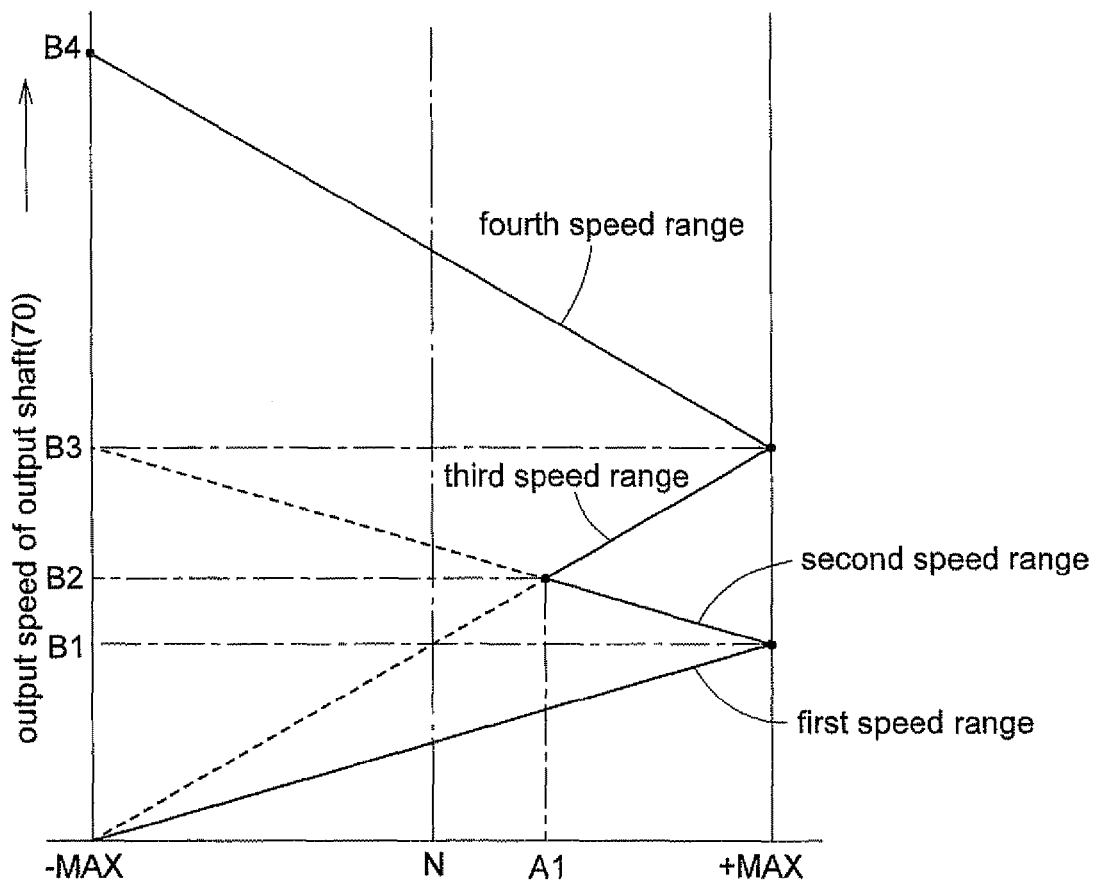
FIG. 4 is an explanatory figure illustrating relationship among speed change conditions of a stepless speed change section, speed ranges of the speed change output section and output speeds.

FIG. 3 is an explanatory view illustrating relationship between operational conditions of the respective clutches CL1-CL4 and speed ranges as the operational conditions of the speed change output section 3b. The sign "ENGAGED" shown in FIG. 3 represents the engaged condition of the respective clutch CL1-CL4 and the sign "–" represents the disengaged condition of the respective clutch CL1-CL4. FIG. 4 is an explanatory view illustrating relationship among speed change conditions of the stepless speed change section 20, the speed ranges of the speed change output section 3b and output speeds by the output shaft 70 of the speed change output section 3b. The horizontal axis in FIG. 4 shows the speed change conditions of the stepless speed change section 20 and the vertical axis represents the output speeds by the output shaft 70. The sign "–MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. The sign "A1" represents a speed change condition between "N" and "+MAX" of the stepless speed change section 20.

As shown in these figures, when the first speed clutch CL1 is operated into the engaged condition while the second speed clutch CL2, the third speed clutch CL3 and the fourth speed clutch CL4 are operated to the disengaged condition, the speed change output section 3b operates such that the combined drive forces outputted from the first output member 41 and the second output member 42 of the planetary transmission section 3a are transmitted in the first speed range by the other first transmission mechanism 72 and the first speed clutch CL1 to the output shaft 70 and from this output shaft 70 to the forward/reverse switchover device 30. When the planetary transmission section 3a is operated as described above, if the stepless speed change section 20 is speed changed from "–MAX" toward "+MAX", then, in association therewith, the rotational speed of the output shaft 70 is steplessly increased from "0". When the stepless speed change section 20 reaches the speed change condition "+MAX", the rotational speed of the output shaft 70 becomes "B1".

When the second speed clutch CL2 is operated into the engaged condition while the first speed clutch CL1, the third speed clutch CL3 and the fourth speed clutch CL4 are operated to the disengaged condition, the speed change output section 3b operates such that the combined drive forces outputted from the first output member 41 and the second output member 42 of the planetary transmission section 3a are transmitted in the second speed range by the one first transmission mechanism 73 and the second speed clutch CL2 to the output shaft 70 and from this output shaft 70 to the forward/reverse switchover device 30. When the planetary transmission section 3a is operated as described above, if the stepless speed change section 20 is decelerated from "+MAX", then, in association therewith, the rotational speed of the output shaft 70 is steplessly increased from "B1". When the stepless speed change section 20 reaches the speed change condition "A1", the rotational speed of the output shaft 70 becomes "B2".

When the third speed clutch CL3 is operated into the engaged condition while the first speed clutch CL1, the second speed clutch CL2 and the fourth speed clutch CL4 are operated to the disengaged condition, the speed change output section 3b operates such that the combined drive forces outputted from the first output member 41 and the second output member 42 of the planetary transmission section 3a are transmitted in the third speed range by the one first transmission mechanism 73 and the third speed clutch CL3 to the output shaft 70 and from this output shaft 70 to the forward/reverse switchover device 30. When the planetary transmission section 3a is operated as described above, if the stepless speed change section 20 is accelerated from the forward rotation speed "A1", then, in association therewith, the rotational speed of the output shaft 70 is steplessly increased from "B2". When the stepless speed change section 20 reaches the speed change condition "+MAX", the rotational speed of the output shaft 70 becomes "B3".

When the fourth speed clutch CL4 is operated into the engaged condition while the first speed clutch CL1, the second speed clutch CL2 and the third speed clutch CL3 are operated to the disengaged condition, the speed change output section 3b operates such that the combined drive forces outputted from the first output member 41 and the second output member 42 of the planetary transmission section 3a are transmitted in the fourth speed range by the other second transmission mechanism 74 and the fourth speed clutch CL4 to the output shaft 70 and from this output shaft 70 to the forward/reverse switchover device 30. When the planetary transmission section 3a is operated as described above, if the stepless speed change section 20 is speed changed from "+MAX" toward "–MAX", then, in association therewith, the rotational speed of the output shaft 70 is steplessly increased from "B3". When the stepless speed change section 20 reaches the speed change condition "–MAX", the rotational speed of the output shaft 70 becomes "B4".

As shown in FIG. 1, the forward/reverse switchover device 30 includes, in addition to the input shaft 31 and the output shaft 32, a forward clutch CF having an input side rotational member thereof coupled via a coupling member 34 to the input shaft 31 to be rotatable in unison therewith and an output side rotational member thereof coupled via a coupling member 35 to the output shaft 32 to be rotatable in unison therewith and a reverse clutch CR having an input side rotational member thereof coupled via a reverse gear transmission mechanism 33 to the input shaft 31 to be rotatable in unison therewith and an output side rotational member thereof coupled via the coupling member 35 to the output shaft 32 to be rotatable in unison therewith.

More particularly, when the forward clutch CF is operated to the engaged condition and the reverse clutch CR is operated to the disengaged condition, respectively, the forward/reverse switchover mechanism 30 provides a forward traveling condition wherein the drive force of the input shaft 31 is transmitted via the forward clutch CF to the output shaft 32. When the forward clutch CF is operated to the disengaged condition and the reverse clutch CR is operated to the engaged condition, respectively, the forward/reverse switchover mechanism 30 provides a reverse traveling condition wherein the drive force of the input shaft 31 is transmitted via the reverse transmission gear mechanism 33 and the reverse clutch CR to the output shaft 32.

Figure 5:
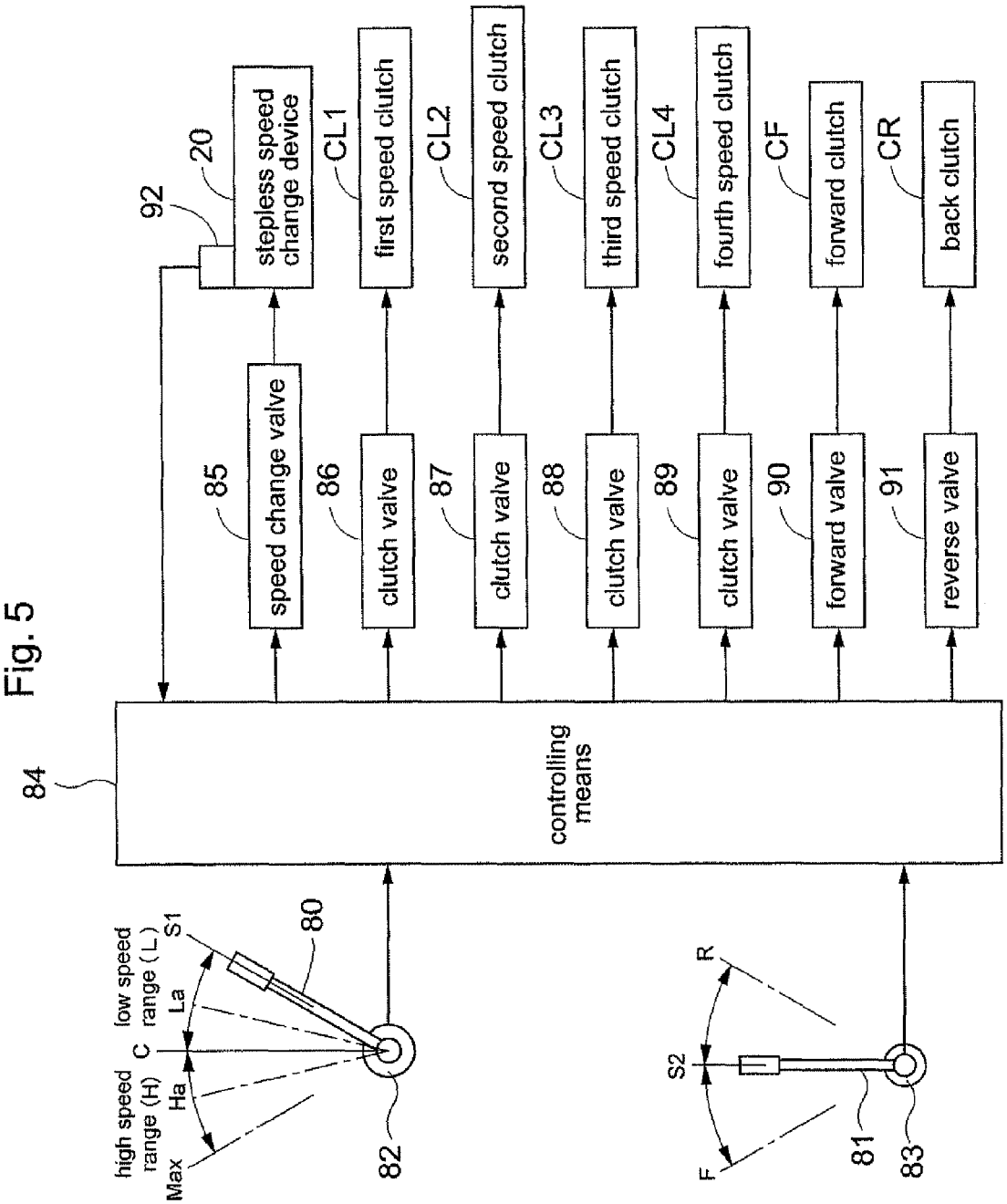
FIG. 5 is a block diagram of a traveling control device.

FIG. 5 is a block diagram of a traveling control device provided in a work vehicle such as a tractor. As shown in this figure, the traveling control device includes a main speed change lever 80 and a forward/reverse lever 81 which are provided at a driving section of the tractor, a speed change detecting means 82 operatively coupled with the main speed change lever 80, a forward/reverse detecting means 83 operatively coupled to the forward/reverse lever 81, and a controlling means 84 operable coupled with this forward/reverse detecting means 83 and the speed change detecting means 82. The controlling means 84 is operatively connected to respective electromagnetic controlling portions of a speed change valve 85 for speed changing the stepless speed change section 20, clutch valves 86-89 for switching over the respective clutches CL1-CL4, a forward valve 90 for switching over the forward clutch CF and a reverse valve 91 for switching over the reverse clutch CR. The controlling means 84 is operatively coupled to a speed change condition detecting means 92 provided in the stepless speed change section 20.

The main speed change lever 80 is pivotally operated over an operational range from a neutral position S1 to a maximum speed position Max. In the operational range of the main speed change lever 80, a portion thereof from the neutral position S1 to an intermediate position C is a low speed range L used mainly for a utility implement operation, whereas, a portion thereof from the neutral position C to the maximum speed position Max is a high speed range H used mainly for traveling. The forward/reverse lever 81 is configured to be switched over to/from a neutral position S2, a forward position F and a reverse position R.

The speed change detecting means 82 is comprised of a rotation potentiometer having an operational portion thereof coupled to the main speed change lever 80 and configured to detect an operation position to which the main speed change lever 80 has been operated and then output this detection result to the controlling means 84. The forward/reverse detecting means 83 is comprised of a rotation potentiometer having an operational portion thereof coupled to the forward/reverse lever 81 and configured to detect an operation position to which the forward/reverse lever 81 has been operated and then output this detection result to the controlling means 84. The speed change condition detecting means 92 detects the speed change condition of the stepless speed change section 20 and feedbacks this detection result to the controlling means 94.

The controlling means 84 is constructed by using a microcomputer. In operation, based on the detection information from the speed change detecting means 82 and the speed change condition detecting means 92, the controlling means 84 operates the stepless speed change section 20 by operating the speed change valve 85 and switching over the respective clutches CL1-CL4 by switching over the respective clutch valves 86-89 so as to render the speed change transmission apparatus 3 into an operational condition wherein an output of a rotational speed corresponding to the operational position of the main speed change lever 80 may be outputted from the output shaft 70.

Further, based on the detection information from the forward/reverse detecting means 83, the controlling means 84 operates the forward clutch CF by switching over the forward valve 90 and operates the reverse clutch CR by switching over the reverse valve 91 so as to render the speed change transmission apparatus 3 into an operational condition wherein an output of a rotational speed corresponding to the operational position of the forward/verse lever 81.

That is, when the tractor is to travel, in response to a pivotal operation of the main speed change lever 80 from the neutral position S1, the tractor travels. Then, as the operational stroke of the main speed change lever 80 from the neutral position S1 is increased, the traveling speed of the tractor is increased. And, when the main speed change lever 80 is operated to the maximum speed position Max, the traveling speed of the tractor becomes the maximum.

More particularly, after its pivotal operation from the neutral position S1, until the main speed change lever 80 reaches a set position La which is in the low speed range L (this position will be referred to as the low speed set position La hereinafter), the controlling means 84 maintains the first speed clutch CL1 under its engaged condition, whereby the speed change transmission apparatus 3 is rendered into the first speed range and effects a speed change operation. Further, as the main speed change lever 80 is pivotally operated from the neutral position S1, the controlling means 84 operates the stepless speed change section 20 from the speed change condition "−MAX" toward the speed change condition "+MAX". With this, in association with the operation of the main speed change lever 80 from the neutral position S1, the output rotational speed of the output shaft 70 is increased steplessly from "0". When the main speed change lever 80 reaches the low speed set position La, the output rotational speed of the output shaft 70 becomes "B1". Under this condition, the controlling means 84 switches over the first speed clutch CL1 into the disengaged condition and switches over the second speed clutch CL2 into the engaged condition, respectively, whereby the speed change transmission device 2 is switched into the second speed range. Thereafter, until the main speed change lever 80 is moved from the low speed set position L1 to an intermediate position C, the controlling means 84 maintains the second speed clutch CL2 under the engaged condition, whereby the speed change transmission apparatus 3 is maintained in the second speed range and effects speed change operation.

Further, as the main speed change lever 80 is pivotally operated from the low speed set position La, the controlling means 84 operates the stepless speed change section 20 from the speed change condition "+MAX" toward the forward rotation speed "A1". With this, in association with the operation of the main speed change lever 80 from the low speed set position La, the output rotational speed of the output shaft 70 is increased steplessly from "B1". When the main speed change lever 80 reaches the intermediate position C, the output rotational speed of the output shaft 70 becomes "B2". Under this condition, the controlling means 84 switches over the second speed clutch CL2 into the disengaged condition and switches over the third speed clutch CL3 into the engaged condition, respectively, whereby the speed change transmission device 2 is switched into the third speed range. Thereafter, until the main speed change lever 80 is moved from the intermediate position C to a set position Ha in the high speed range Ha (this position will be referred to as the high speed set position Ha hereinafter), the controlling means 84 maintains the third speed clutch CL3 under the engaged condition, whereby the speed change transmission apparatus 3 is maintained in the third speed range and effects speed change operation. Further, as the main speed change lever 80 is pivotally operated from the intermediate position C, the controlling means 84 operates the stepless speed change section 20 from the forward rotation speed "A1" toward "+MAX". With this, in association with the pivotal operation of the main speed change lever 80 from the intermediate position C, the output rotational speed of the output shaft 70 is increased steplessly from "B2". When the main speed change lever 80 reaches the high speed set position Ha, the output rotational speed of the output shaft 70 becomes "B3". Under this condition, the controlling means 84 switches over the third speed clutch CL3 into the disengaged condition and switches over the fourth speed clutch CL4 into the engaged condition, respectively, whereby the speed change transmission apparatus 3 is switched into the fourth speed range. Thereafter, until the main speed change lever 80 is moved from the high speed set position Ha to reach the maximum speed position Max, the controlling means 84 maintains the fourth speed clutch CL4 under the engaged condition, whereby the speed change transmission apparatus 3 is maintained in the fourth speed range and effects speed change operation. Still further, as the main speed change lever 80 is pivotally operated from the high speed set position Ha, the controlling means 84 operates the stepless speed change device 20 from the speed condition "+MAX" toward "−MAX". With this, in association with the pivotal operation of the main speed change lever 80 from the high speed set position Ha, the output rotational speed by the output shaft 70 is steplessly increased from "B3". When the main speed change lever 80 reaches the maximum speed position Max, the controlling means 84 has maintained the fourth clutch CL4 under the engaged condition, thus rendering the speed change transmission apparatus 3 in the fourth speed range; and also the controlling means 84 operates the stepless speed change section 20 to the speed change condition "−MAX", whereby the output rotational speed by the output shaft 70 becomes the highest speed "B4".

In the above-described traveling, the forward/reverse lever 81 is set to the forward position F. Then, the controlling means 84 operates the forward clutch CF to the engaged condition and operates the reverse clutch CR to the disengaged condition, respectively. With this, the forward/reverse switchover device 30 is rendered into the forward traveling condition, so that the output force from the output shaft 70 is converted to the forward drive force and transmitted as such to the rear wheel differential mechanism 5 and the front wheel differential mechanism 9 and the tractor travels forwardly. On the other hand, if the forward/reverse lever 81 is set to the reverse position R, the controlling means 84 operates the forward clutch CF to the disengaged condition and operates the reverse clutch CR to the engaged condition, respectively. With this, the forward/reverse switchover device 30 is rendered into the reverse traveling condition, so that the output force from the output shaft 70 is converted to the reverse drive force and transmitted as such to the rear wheel differential mechanism 5 and the front wheel differential mechanism 9 and the tractor travels reversely.

Incidentally, if the forward/reverse lever 81 is operated to the neutral position S2, the controlling means 84 operates the forward clutch CF and the reverse clutch CR to the disengaged conditions. With this, the forward/reverse switchover device 30 is rendered into the neutral condition, so that the power transmission to the rear wheel differential mechanism 5 and the front wheel differential mechanism 9 is stopped and the tractor enters a stop condition.

FIG. 2 show cross sectional constructions of the respective clutches CL1-CL4. As shown in this figure, each one of the clutches CL1-CL4 includes an input side rotational member 95 supported to the output gear 71*b*, 72*b*, 73*b*, 74*b* to be rotatable in unison therewith, an output side rotational member 96 supported to the output shaft 70 to be rotatable in unison therewith, and a multiple disc type friction clutch body 97 provided between/across the output side rotational member 96 and the input side rotational member 95.

Each clutch CL1-CL4 includes a hydraulic piston 98 provided inside the output side rotational member 96. Each hydraulic piston 98 is connected via an operational oil path 99 provided within the output shaft 70 to a corresponding one of the clutch valves 86-89.

More particularly, with the respective clutches CL1-CL4 in operation, the clutch is rendered into the engaged condition when pressure oil is fed from the clutch valve 86, 87, 88, 89 to the hydraulic piston 98 and this hydraulic piston 98 presses the friction clutch body 97. The clutch is rendered into the disengaged condition when the pressure oil is discharged by the clutch valve 86, 87, 88, 89 from the hydraulic piston 98 and the hydraulic pressure applied by the hydraulic piston 98 to the friction clutch body 97 is released.

Embodiment 2

Figure 6:
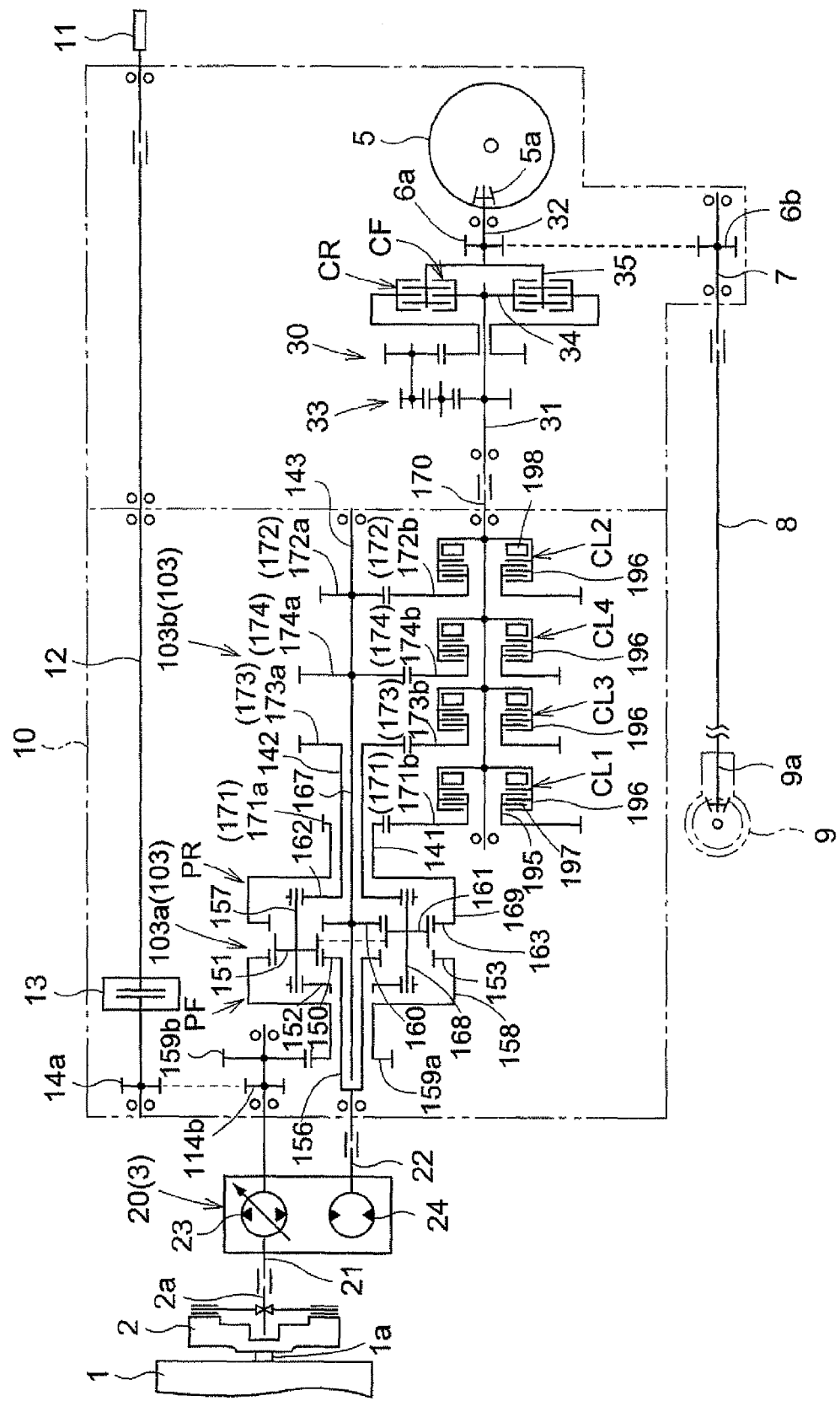
FIG. 6 is a diagram of a traveling transmission apparatus including a speed change transmission apparatus according to Embodiment 2.

FIG. 6 is a diagram showing a speed change transmission apparatus 103 according to Embodiment 2. Here, like members as those in Embodiment 1 are denoted with like reference marks or numerals and will not be explained in repetition basically. The speed change transmission apparatus 103 according to Embodiment 2 is mounted in a traveling transmission apparatus included in a tractor. This traveling transmission apparatus includes a main clutch 2 receiving output from an output shaft 1*a* of an engine 1, the speed change transmission apparatus 103 receiving output of the main clutch 2, a forward/reverse switchover device 30 operatively coupled to an output shaft 170 of this speed change transmission apparatus 103, a rear wheel differential mechanism 5 operatively coupled to an output shaft 32 of this forward/reverse switchover device 30 and a front wheel differential mechanism 9 operatively coupled to the output shaft 32 of the forward/reverse switchover device 30.

Comparing the traveling transmission apparatus mounting the speed change transmission apparatus 103 according to Embodiment 2 with the traveling transmission apparatus mounting the speed change transmission apparatus according to Embodiment 1, the traveling transmission apparatus mounting the speed change transmission apparatus 103 according to Embodiment 2 has the same construction as the traveling transmission apparatus mounting the speed change transmission apparatus according to Embodiment 1 in the respects of the main clutch 2, the forward/reverse switchover device 30, the rear wheel differential mechanism 5 and the front wheel differential mechanism 9. The traveling transmission apparatus mounting the speed change transmission apparatus 103 according to Embodiment 2 and the traveling transmission apparatus mounting the speed change transmission apparatus according to Embodiment 1 have different constructions in that the output of the speed change transmission apparatus 103 is transmitted to the forward/reverse switchover device 30. That is, in the case of the traveling transmission apparatus mounting the speed change transmission apparatus 103 according to Embodiment 2, the output shaft 170 of the speed change transmission apparatus 103 is connected to the input shaft 31 of the forward/reverse switchover device 30 to be rotatable in unison therewith.

Next, the speed change transmission apparatus 103 according to Embodiment 2 will be described in greater details. The speed change transmission apparatus 103 according to Embodiment 2 includes a hydrostatic stepless speed change section 20 (will be referred to as the stepless speed change section 20 for short, hereinafter) disposed rearwardly of the main clutch 2 relative to the vehicle body, a planetary transmission section 103a disposed rearwardly of this stepless speed change section 20 relative to the vehicle body, and a speed change output section 103b disposed forwardly of the forward/reverse switchover device 30 relative to the vehicle body Comparing the speed change transmission apparatus 103 according to Embodiment 2 with the speed change transmission apparatus according to Embodiment 1, the speed change transmission apparatus 103 according to Embodiment 2 has the same construction as the speed change transmission apparatus according to Embodiment 1 in the respect of the stepless speed change section 20. The speed change transmission apparatus 103 according to Embodiment 2 has different constructions from the speed change transmission apparatus according to Embodiment 1 in the respects of the planetary transmission section 103a and the speed change output section 103b. Next, the planetary transmission section 103a and the speed change output section 103b of the speed change transmission apparatus 103 according to Embodiment 2 will be described.

As shown in FIG. 6, the planetary transmission section 103a included in the speed change transmission apparatus 103 according to Embodiment 2 includes a pair of planetary transmission mechanisms PF, PR juxtaposed along the fore-and-aft direction of the vehicle body, and three output members 141, 142, 143 disposed rearwardly relative to the vehicle body of the rear planetary transmission mechanism PR which is disposed rearwardly relative to the vehicle body of the pair of planetary transmission mechanisms PF, PR.

Of the pair of planetary transmission mechanisms PF, PR, the front planetary transmission mechanism PF which is disposed on the front side relative to the vehicle body includes a sun gear 150 supported to a cylindrical shaft type rotation support shaft 56 to be rotatable in unison therewith, a plurality of planet gears 151 disposed in distribution along the outer periphery of this sun gear 150 and along the peripheral direction of the sun gear 150 and meshed with this sun gear 150, a carrier 52 rotatably supporting the respective planet gears 151 and a ring gear 153 having inner teeth meshed with the respective planet gears 151.

Of the pair of planetary transmission mechanisms PF, PR, the rear planetary transmission mechanism PR which is disposed on the rear side relative to the vehicle body includes a sun gear 160 supported to a rotation support shaft 167 to be rotatable in unison therewith, a plurality of planet gears 161 disposed in distribution along the outer periphery of this sun gear 160 and along the peripheral direction of the sun gear 160 and meshed with this sun gear 160, a carrier 62 rotatably supporting the respective planet gears 161 and a ring gear 163 having inner teeth meshed with the respective planet gears 161. These arrangements of the planetary mechanism are same as those shown in FIG. 7.

Figure 7:
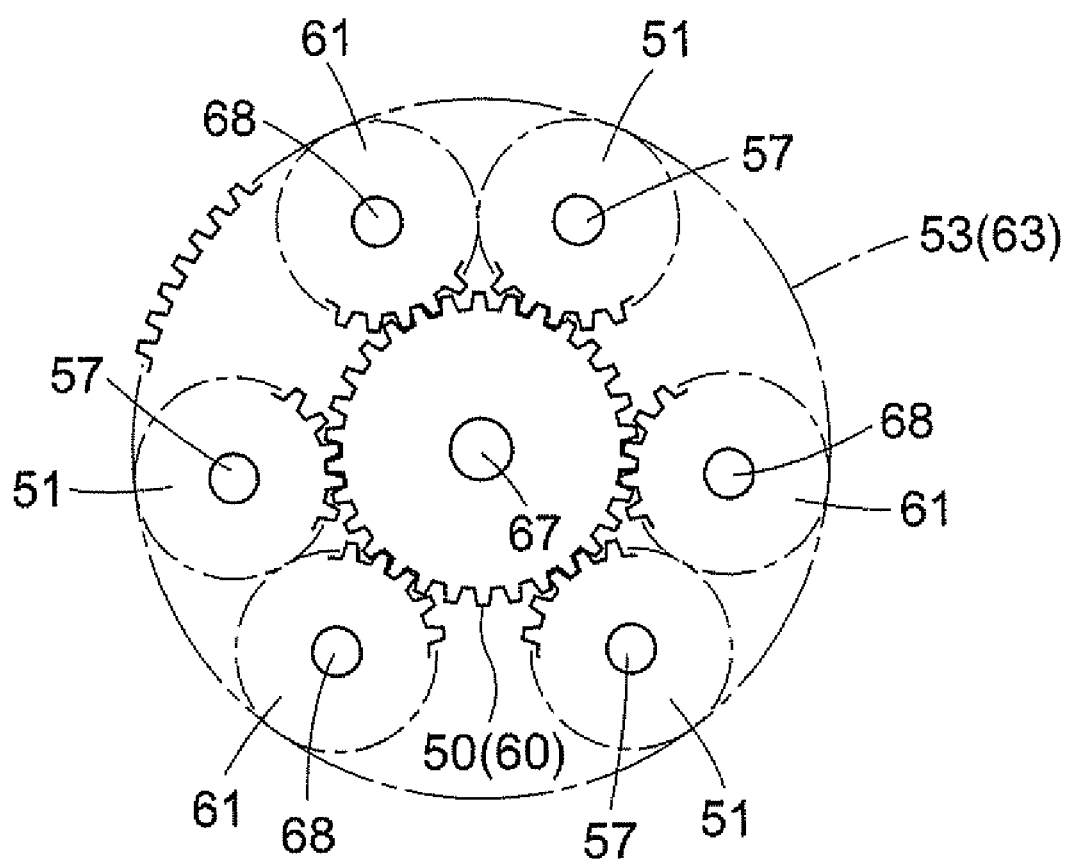
FIG. 7 is a diagram in front view of a planetary transmission section of the speed change transmission apparatus according to Embodiment 2.

As shown in FIG. 7, the planet gears 151 of the front planetary transmission mechanism PF and the planet gears 161 of the rear planetary transmission mechanism PR corresponding to each other at a plurality of positions in the peripheries of the sun gears 150, 160 of the front planetary transmission mechanism PF and the rear planetary transmission mechanism PR are meshed with each other at the rear end portions of the planet gears 151 and the front end portions of the planet gears 161. As shown in FIG. 6, a support shaft 157 rotatably supporting the respective planet gears 151 of the front planetary transmission mechanism PF is supported between/across the carrier 52 of the front planetary transmission mechanism PF and the carrier 62 of the rear planetary transmission mechanism PR and is rotatable relative to the respective carriers 52, 62. The rotation support shaft 56 of the sun gear 150 of the front planetary transmission mechanism PF is connected to the motor shaft 22 of the stepless speed change section 20 to be rotatable in unison therewith.

The ring gear 153 of the front planetary transmission mechanism PF is operatively coupled to the pump shaft 21 via a rotation coupling member 58 having one end side thereof connected to this ring gear 153 to be rotatable in unison therewith, a transmission gear 59a connected to the other end side of this rotation coupling member 58 to be rotatable in unison therewith, and a transmission gear 59b meshed with this transmission gear 59a and supported to the pump shaft 21 of the stepless speed change section 20 to be rotatable in unison therewith.

The three output members 141, 142, 143 mentioned above are comprised of shaft members which are superposed as a coaxial triple shaft construction to be rotatable relative to each other. The first output member 141 (ring gear output member) of the three output members 141, 142, 143 is comprised of a cylinder shaft disposed on the outermost side of the triple shaft construction and is coupled via a rotation coupling member 69 to the ring gear 63 of the rear planetary transmission mechanism PR. The second output member 142 (carrier output member) of the three output members 141, 142, 143 is comprised of a cylinder shaft disposed on the intermediate side of the triple shaft construction and is coupled to the carrier 62 of the rear planetary transmission mechanism PR. The third output member 143 (sun gear output member) of the three output members 141, 142, 143 is comprised of a shaft disposed on the innermost side of the triple shaft construction and is rotatable in unison with the rotation support shaft 167 of the sun gear 160 of the rear planetary transmission mechanism PR.

That is, the planetary transmission section 103a is constructed as a compound planetary type having the front planetary transmission mechanism PP and the rear planetary transmission mechanism PR operatively coupled with each other such that the planet gears 151 of the front planetary transmission mechanism PF and the planet gears 161 of the rear planetary transmission mechanism PR mesh with each other and are rotated about the axes of their own and at the same time with maintaining this condition, they revolve about the sun gears 150, 160. And, the planetary transmission section 103a is constructed such that the drive force of the motor shaft 21 as an engine drive force not subjected to any speed change action by the stepless speed change section 20 is inputted to the ring gear 153 of the front planetary transmission mechanism PF, the output of the pump shaft 21 of the stepless speed change section 20 is inputted to the sun gear 150 of the front planetary transmission mechanism PF, and the engine drive force not subjected to any speed change action by the stepless speed change section 20 and the output of the stepless speed change section 20 are combined/synthesized by the front planetary transmission mechanism PF and the rear planetary transmission mechanism PR, and this combined/synthesized drive force is outputted from the three output members 141, 142, 143.

As shown in FIG. 6, the speed change output section 103b includes, in addition to the output shaft 170, a first transmission mechanism 171 provided between and across this output shaft 170 and the first output member 141, a second transmission mechanism 172 provided between and across the output shaft 170 and the third output member 143, a third transmission mechanism 173 provided between and across the output shaft 170 and the second output member 142, a fourth transmission mechanism 174 provided between and across the output shaft 170 and the third output member 143, and clutches CL1, CL2, CL3, CL4 provided in the four transmission mechanisms 171, 172, 173, 173 described above.

The first transmission mechanism 171 includes an input gear 171a mounted on the first output member 141 to be rotatable in unison therewith and an output gear 171b meshed with this input gear 171a and rotatably mounted on the output shaft 170. The second transmission mechanism 172 includes an input gear 172a mounted on the third output member 143 to be rotatable in unison therewith and an output gear 172b meshed with this input gear 172a and rotatably mounted on the output shaft 170. The third transmission mechanism 173 includes an input gear 173a mounted on the second output member 142 to be rotatable in unison therewith and an output gear 173b meshed with this input gear 173a and rotatably mounted on the output shaft 170. The fourth transmission mechanism 174 includes an input gear 174a mounted on the third output member 143 to be rotatable in unison therewith and an output gear 174b meshed with this input gear 174a and rotatably mounted on the output shaft 170.

Each one of the clutches CL1-CL4 included in the respective transmission mechanisms 171-174 includes an input side rotational member 195 provided on the output gear 171b, 172b, 173b, 174b to be rotatable in unison therewith, an output side rotational member 196 supported to the output shaft 170 to be rotatable in unison therewith, a multiple disc type friction clutch body 197 provided between this output side rotational member 196 and the input side rotational member 195, and a hydraulic piston 198 provided within the output side rotational member 196. With each clutch CL1-CL4 in operation, as the hydraulic piston 198 presses the multiple discs (not shown) of the friction clutch body 197, the clutch is rendered into the engaged condition for rotating the input side rotational member 195 and the output side rotational member 196 together through friction therebetween. When the pressing operation by the hydraulic piston 198 to the clutch discs of the friction clutch body is released, the clutch is rendered into the disengaged condition for breaking the operable coupling between the input side rotational member 195 and the output side rotational member 196.

With each one of the transmission mechanisms 171-174 in operation, as the clutch CL1-CL4 included in this transmission mechanism 171-174 is switched into the engaged condition, the drive force of the first output member 141 or the second output member 142 or the third output member 143 is transmitted to the output shaft 170 via the input gear 171a, 172a, 173a, 174a, the output gear 171b, 172b, 173b, 174b and the clutch CL1, CL2, CL3, CL4. Whereas, as the clutch CL1-CL4 is switched into the disengaged condition, the transmission of the drive force of the first output member 141 or the second output member 142 or the third output member 143 to the output shaft 170 is broken.

The transmission ratios of the respective transmission mechanisms 171-174 are set such that the rotational speeds of the output shaft 170 when the output shaft 170 is driven by the respective transmission mechanisms 171-174 may differ from each other as follows. Namely, according to the setting, the rotational speed when driven by the second transmission mechanism 172 is higher than the rotational speed when driven by the first transmission mechanism 171; the rotational speed when driven by the third transmission mechanism 173 is higher than the rotational speed when driven by the second transmission mechanism 172; and the rotational speed when driven by the fourth transmission mechanism 174 is higher than the rotational speed when driven by the third transmission mechanism 173.

Figure 9:
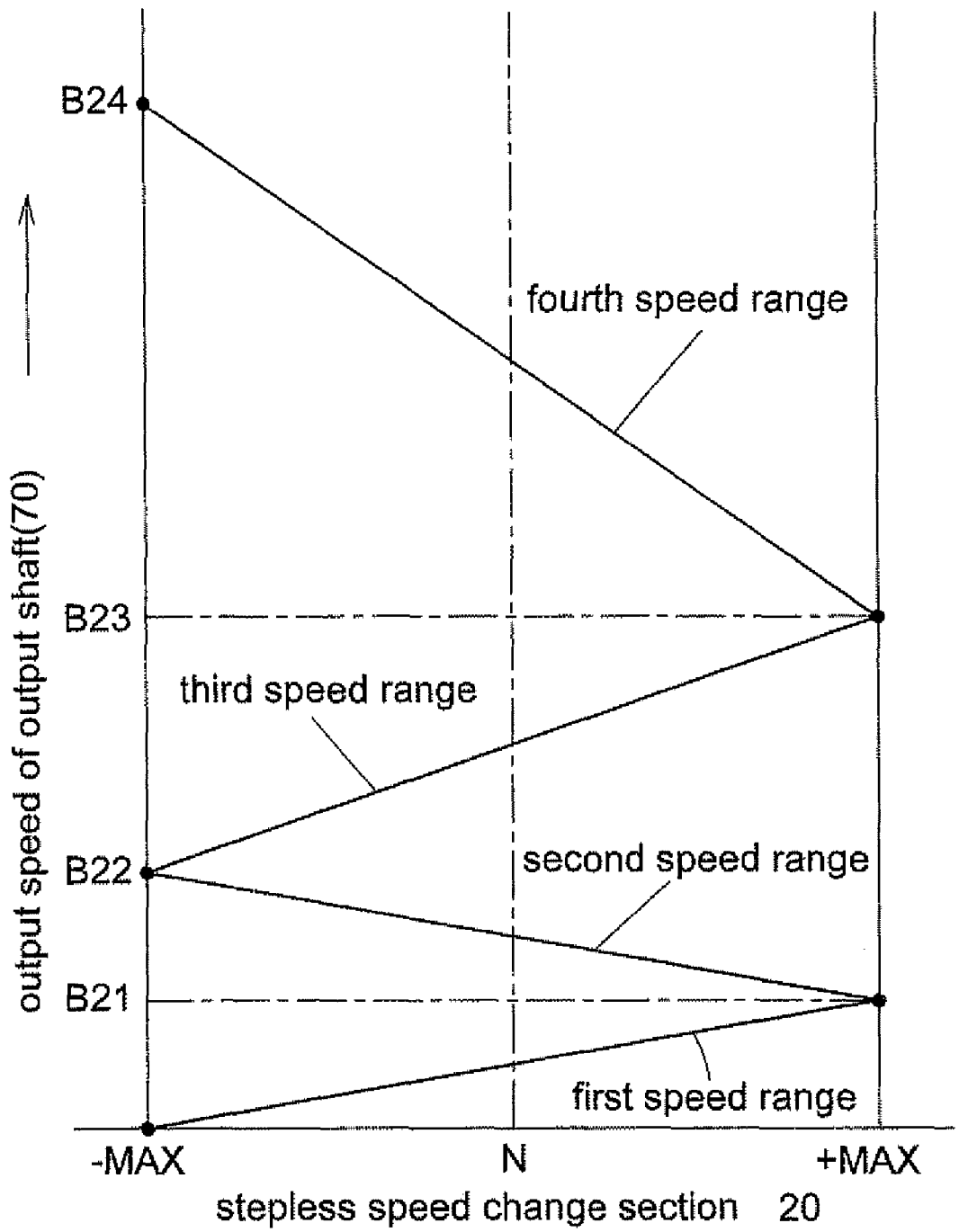
FIG. 9 is an explanatory figure illustrating relationship among speed change conditions of a stepless speed change section, speed ranges of the speed change output section and output speeds in the speed change transmission apparatus according to Embodiment 2.

FIG. 8 is a diagram illustrating relationship between operational conditions of the respective clutches CL1-CL4 and speed ranges as operational conditions of the speed change output section 103b. The sign "ENGAGED" shown in FIG. 8 represents the engaged condition of each clutch CL1-CL4. The sign "–" represents the disengaged condition of each clutch CL1-CL4. FIG. 9 is an explanatory view illustrating relationship among operational conditions of the stepless speed change section 20, speed ranges of the speed change output section 103b, and output speeds by the output shaft 170 of the speed change output section 103b. The horizontal axis in FIG. 9 represents the speed change conditions of the stepless speed change section 20 and the vertical axis represents the output speeds by the output shaft 170. The sign "–MAX" on the horizontal axis represents the speed change condition where the output speed by the motor shaft 22 of the stepless speed change section 20 is maximum in the reverse rotation direction. The sign "N" represents the neutral condition of the stepless speed change section 20. The sign "+MAX" on the horizontal axis represents the speed change condition where the output speed by the motor shaft 22 of the stepless speed change section 20 is maximum in the forward rotation direction.

As shown in these figures, with the speed change transmission apparatus 103 according to Embodiment 2, with a speed change operation of the stepless speed change section 20 and appropriate switchover of the respective clutches CL1, CL2, CL3, CL4 of the speed change output section 103b, in association therewith, the drive force from the engine 1 is provided in four speed ranges and also in each speed range, the force is speed changed steplessly and then transmitted as such from the output shaft 170 to the forward/reverse switchover device 30.

More particularly, when the first speed clutch CL1 is operated into the engaged condition while the second speed clutch CL2, the third speed clutch CL3 and the fourth speed clutch CL4 are operated to the disengaged condition, the speed change output section 103b operates such that the combined drive forces outputted from the first output member 141 and the second output member 142 and the third output member 143 of the planetary transmission section 3a are transmitted in the first speed range by the first transmission mechanism 171 and the first speed clutch CL1 to the output shaft 170 and from this output shaft 170 to the forward/reverse switchover device 30. When the planetary transmission section 103a is operated as described above, if the stepless speed change section 20 is speed changed from "–MAX" toward "+MAX", then, in association therewith, the rotational speed of the output shaft 170 is steplessly increased from "0". When the stepless speed change section 20 reaches the speed change condition "+MAX", the rotational speed of the output shaft 170 becomes "B21".

When the second speed clutch CL2 is operated into the engaged condition while the first speed clutch CL1, the third speed clutch CL3 and the fourth speed clutch CL4 are operated to the disengaged condition, the speed change output section 103b operates such that the combined drive forces outputted from the first output member 141, the second output member 142 and the third output member 143 of the planetary transmission section 103a are transmitted in the second speed range by the second transmission mechanism 172 and the second speed clutch CL2 to the output shaft 170 and from this output shaft 170 to the forward/reverse switchover device 30. When the speed change output section 103b is operated as described above, if the stepless speed change section 20 is operated from "+MAX" toward "−MAX", then, in association therewith, the rotational speed of the output shaft 170 is steplessly increased from "B21". When the stepless speed change section 20 reaches the speed change condition "−MAX", the rotational speed of the output shaft 170 becomes "B22".

When the third speed clutch CL3 is operated into the engaged condition while the first speed clutch CL1, the second speed clutch CL3 and the fourth speed clutch CL4 are operated to the disengaged condition, the speed change output section 103b operates such that the combined drive forces outputted from the first output member 141, the second output member 142 and the third output member 143 of the planetary transmission section 103a are transmitted in the third speed range by the third transmission mechanism 173 and the third speed clutch CL3 to the output shaft 170 and from this output shaft 170 to the forward/reverse switchover device 30. When the speed change output section 103b is operated as described above, if the stepless speed change section 20 is operated from "−MAX" toward "+MAX", then, in association therewith, the rotational speed of the output shaft 170 is steplessly increased from "B22". When the stepless speed change section 20 reaches the speed change condition "+MAX", the rotational speed of the output shaft 170 becomes "B23".

When the fourth speed clutch CL4 is operated into the engaged condition while the first speed clutch CL1, the second speed clutch CL2 and the third speed clutch CL3 are operated to the disengaged condition, the speed change output section 103b operates such that the combined drive forces outputted from the first output member 141, the second output member 142 and the third output member 143 of the planetary transmission section 103a are transmitted in the fourth speed range by the fourth transmission mechanism 174 and the fourth speed clutch CL4 to the output shaft 170 and from this output shaft 170 to the forward/reverse switchover device 30. When the speed change output section 103b is operated as described above, if the stepless speed change section 20 is speed changed from "+MAX" toward "−MAX", then, in association therewith, the rotational speed of the output shaft 170 is steplessly increased from "B23". When the stepless speed change section 20 reaches the speed change condition "−MAX", the rotational speed of the output shaft 70 becomes the maximum speed "B24".

In this embodiment too, there is provided a control apparatus including the controlling means shown in FIG. 5.

Therefore, like Embodiment 1, after its pivotal operation from the neutral position S1, until the main speed change lever 80 reaches a set position La which is in the low speed range L (this position will be referred to as the low speed set position La hereinafter), the controlling means 84 maintains the first speed clutch CL1 under its engaged condition, whereby the speed change transmission apparatus 3 is rendered into the first speed range and effects a speed change operation. Further, as the main speed change lever 80 is pivotally operated from the neutral position S1, the controlling means 84 operates the stepless speed change section 20 from the speed change condition "−MAX" toward the speed change condition "+MAX". With this, in association with the operation of the main speed change lever 80 from the neutral position S1, the output rotational speed of the output shaft 170 is increased steplessly from "0,". When the main speed change lever 80 reaches the low speed set position La, the output rotational speed of the output shaft 170 becomes "B21". Under this condition, the controlling means 84 switches over the first speed clutch CL1 into the disengaged condition and switches over the second speed clutch CL2 into the engaged condition, respectively, whereby the speed change transmission apparatus 3 is switched into the second speed range. Thereafter, until the main speed change lever 80 is moved from the low speed set position L1 to the intermediate position C, the controlling means 84 maintains the second speed clutch CL2 under the engaged condition, whereby the speed change transmission apparatus 3 is maintained in the second speed range and effects speed change operation. Further, as the main speed change lever 80 is pivotally operated from the low speed set position La, the controlling means 84 operates the stepless speed change section 20 from the speed change condition "+MAX" toward the speed change condition "−MAX". With this, in association with the operation of the main speed change lever 80 from the low speed set position La, the output rotational speed of the output shaft 170 is increased steplessly from "B21". When the main speed change lever 80 reaches the intermediate position C, the output rotational speed of the output shaft 170 becomes "B22". Under this condition, the controlling means 84 switches over the second speed clutch CL2 into the disengaged condition and switches over the third speed clutch CL3 into the engaged condition, respectively, whereby the speed change transmission apparatus 3 is switched into the third speed range.

Thereafter, until the main speed change lever 80 is moved from the intermediate position C to a set position Ha in the high speed range H (this position will be referred to as the high speed set position Ha hereinafter), the controlling means 84 maintains the third speed clutch CL3 under the engaged condition, whereby the speed change transmission apparatus 3 is maintained in the third speed range and effects speed change operation. Further, as the main speed change lever 80 is pivotally operated from the intermediate position C, the controlling means 84 operates the stepless speed change section 20 from the speed change position "−MAX" toward the speed change position "+MAX". With this, in association with the pivotal operation of the main speed change lever 80 from the intermediate position C, the output rotational speed of the output shaft 170 is increased steplessly from "B22". When the main speed change lever 80 reaches the high speed set position Ha, the output rotational speed of the output shaft 170 becomes "B23". Under this condition, the controlling means 84 switches over the third speed clutch CL3 into the disengaged condition and switches over the fourth speed clutch CL4 into the engaged condition, respectively, whereby the speed change transmission apparatus 3 is switched into the fourth speed range. Thereafter, until the main speed change lever 80 is moved from the high speed set position Ha to reach the maximum speed position Max, the controlling means 84 maintains the fourth speed clutch CL4 under the engaged condition, whereby the speed change transmission apparatus 3 is maintained in the fourth speed range and effects speed change operation. Still further, as the main speed change lever 80 is pivotally operated from the high speed set position Ha, the controlling means 84 operates the stepless speed change device 20 from the speed condition "+MAX" toward "−MAX". With this, in association with the pivotal operation of the main speed change lever 80 from the high speed set position Ha, the output rotational speed by the output shaft 170 is steplessly increased from "B23". When the main speed change lever 80 reaches the maximum speed position Max, the controlling means 84 has maintained the fourth clutch CL4 under the engaged condition, thus rendering the speed change transmission apparatus 3 in the fourth speed range; and also the controlling means 84 operates the stepless speed change section 20 to the speed change condition "−MAX", whereby the output rotational speed by the output shaft 170 becomes the maximum speed "B24".

Embodiment 3

Figure 10:
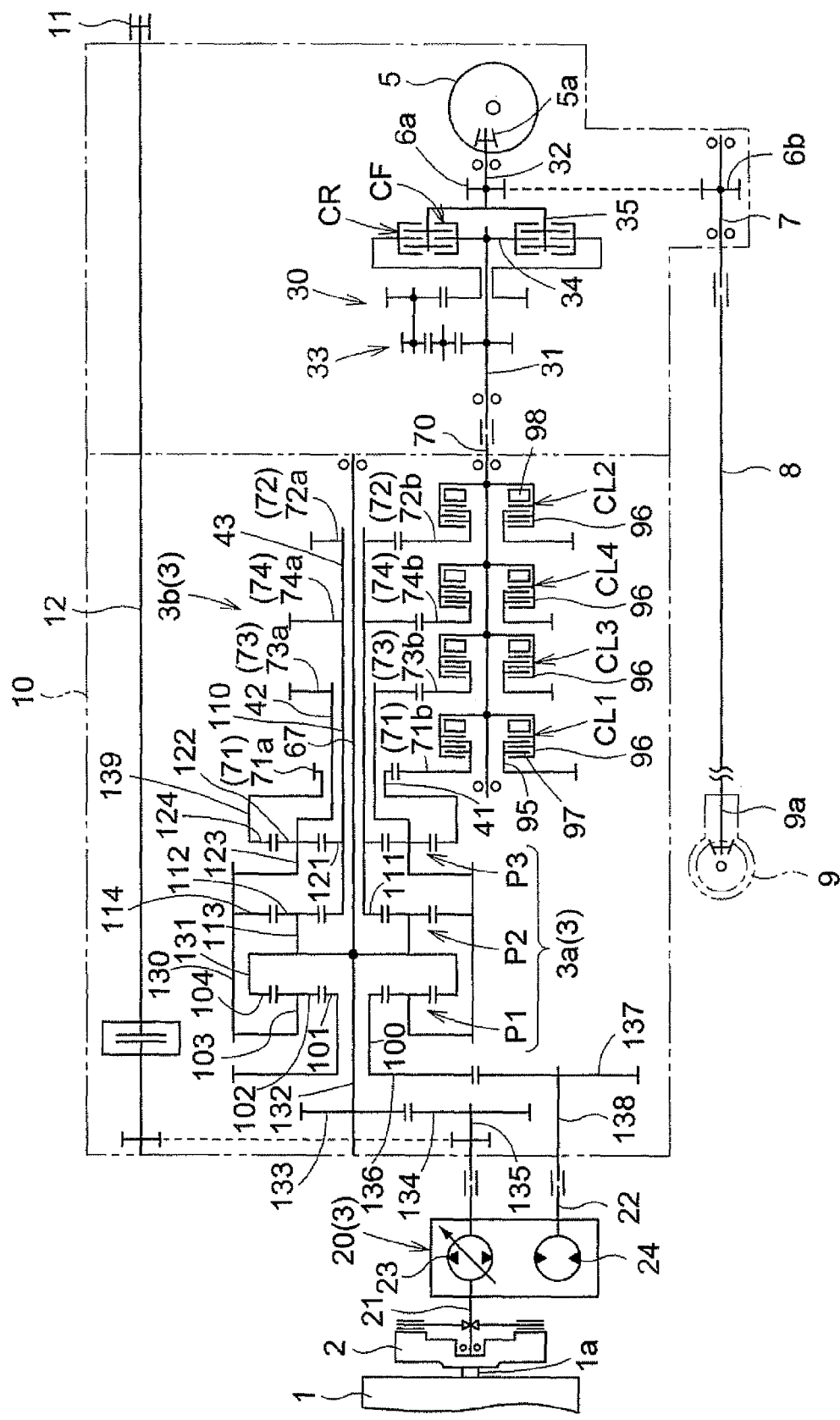
FIG. 10 is a diagram of a traveling transmission apparatus including a speed change transmission apparatus according to Embodiment 3.

FIG. 10 is a diagram showing a speed change transmission apparatus 3 according to Embodiment 3. This traveling transmission apparatus includes a main clutch 2 receiving output from an output shaft 1*a* of an engine 1, the speed change transmission apparatus 3 receiving output of the main clutch 2, a forward/reverse switchover device 30 operatively coupled to an output shaft 70, as an output side rotational member, of this speed change transmission apparatus 3, a rear wheel differential mechanism 5 operatively coupled to an output shaft 32 of this forward/reverse switchover device 30 and a front wheel differential mechanism 9 operatively coupled to the output shaft 32 of the forward/reverse switchover device 30.

Comparing the traveling transmission apparatus mounting the speed change transmission apparatus 3 according to Embodiment 3 with the traveling transmission apparatus mounting the speed change transmission apparatus according to Embodiment 2, the traveling transmission apparatus mounting the speed change transmission apparatus 3 according to Embodiment 3 has the same construction as the traveling transmission apparatus mounting the speed change transmission apparatus according to Embodiment 2 in the respects of the main clutch 2, the forward/reverse switchover device 30, the rear wheel differential mechanism 5 and the front wheel differential mechanism 9.

Next, the speed change transmission apparatus 3 according to Embodiment 3 will be described in greater details. The speed change transmission apparatus 3 according to Embodiment 3 includes a hydrostatic stepless speed change section 20 (will be referred to as the stepless speed change section 20 for short, hereinafter) disposed rearwardly of the main clutch 2 relative to the vehicle body, a planetary transmission section 3*a* disposed rearwardly of this stepless speed change section 20 relative to the vehicle body, and a speed change output section 3*b* disposed forwardly of the forward/reverse switchover device 30 relative to the vehicle body Comparing the speed change transmission apparatus 3 according to Embodiment 3 with the speed change transmission apparatus 3 according to Embodiment 1, the speed change transmission apparatus 3 according to Embodiment 3 has the same construction as the speed change transmission apparatus 3 according to Embodiment 1 in the respect of the stepless speed change section 20 and the speed change output section 3*b*. The speed change transmission apparatus 3 according to Embodiment 2 has different constructions from the speed change transmission apparatus 3 according to Embodiment 1 in the respects of the planetary transmission section 3*a*. Next, the planetary transmission section 3*a* of Embodiment 3 will be described.

As shown in FIG. 10, the planetary transmission section 3*a* of Embodiment 3 includes three planetary transmission mechanisms P1, P2, P3 juxtaposed along the fore-and-aft direction of the vehicle body. Of the three planetary transmission mechanisms P1, P2, P3, the first planetary transmission mechanism P1 which is disposed on the most front side relative to the vehicle body includes a sun gear 101 supported to a cylindrical shaft type rotation support shaft 100 to be rotatable in unison therewith, a plurality of planet gears 102 disposed in distribution along the outer periphery of this sun gear 101 and along the peripheral direction of the sun gear 101 and meshed with this sun gear 101, a carrier 103 rotatably supporting the respective planet gears 102 and a ring gear 104 having inner teeth meshed with the respective planet gears 102. Of the three planetary transmission mechanisms P1, P2, P3, the second planetary transmission mechanism P2 which is disposed at the center in the fore-and-aft direction of the vehicle body includes a sun gear 111 supported to a rotation support shaft 110 to be rotatable in unison therewith, a plurality of planet gears 112 disposed in distribution along the outer periphery of this sun gear 111 and along the peripheral direction of the sun gear 111 and meshed with this sun gear 111, a carrier 113 rotatably supporting the respective planet gears 112 and a ring gear 114 having inner teeth meshed with the respective planet gears 112. The rotation support shaft 110 is formed integral with a sun gear output member 43 to be described later. Of the three planetary transmission mechanisms P1, P2, P3, the third planetary transmission mechanism P3 which is disposed at the most rear side in the fore-and-aft direction of the vehicle body includes a sun gear 121 supported to the rotation support shaft 110 to be rotatable in unison therewith, a plurality of planet gears 122 disposed in distribution along the outer periphery of this sun gear 121 and along the peripheral direction of the sun gear 121 and meshed with this sun gear 121, a carrier 123 rotatably supporting the respective planet gears 122 and a ring gear 124 having inner teeth meshed with the respective planet gears 122. The carrier 103 of the first planetary transmission mechanism P1, the ring gear 114 of the second planetary transmission mechanism P2 and the carrier 123 of the third planetary transmission mechanism P3 are operatively coupled via a coupling member 130 with each other via to be rotatable in unison. The ring gear 104 of the first planetary transmission P1 and the carrier 113 of the second planetary transmission mechanism P2 are operatively coupled via a coupling member 131 to be rotatable in unison with each other. The sun gear 111 of the second planetary transmission mechanism P2 and the sun gear 121 of the third planetary transmission mechanism P3 are operatively coupled via the rotation support shaft 110 to be rotatable in unison. The coupling member 131 is operatively coupled with the pump shaft 21 of the stepless speed change section 20 via a rotation support shaft 132, a transmission gear 133, a transmission gear 134, and a rotation support shaft 135. That is to say, the engine drive force transmitted from the output shaft 1*a* of the engine 1 to the front end side of the pump shaft 21 and outputted from the rear end side of the pump shaft 21 without being subjected to any speed change action by the stepless speed change section 20 is transmitted to the ring gear 104 of the first planetary transmission section P1.

The rotation support shaft 100 is operatively coupled to the motor shaft 22 of the stepless speed change section 20 via a transmission gear 136, a transmission gear 137 and a rotation support shaft 138. That is, the output from the motor shaft 22 of the stepless speed change section 20 is transmitted to the sun gear 101 of the first planetary transmission mechanism P1.

The planetary transmission section 3*a* includes three output members 41, 42, 43 disposed rearwardly of the third planetary transmission section P3 relative to the vehicle body. The three output members 41, 42, 43 mentioned above are comprised of shaft members which are superposed as a coaxial triple shaft construction to be rotatable relative to each other. The ring gear output member 41 of the three output members 41, 42, 43 is comprised of a cylinder shaft disposed on the outermost side of the triple shaft construction and is coupled via a rotation coupling member 139 to the ring gear 124 of the third planetary transmission mechanism P3 to be rotatable in unison therewith, the third planetary transmission mechanism P3 being disposed on the most downstream side of the three planetary transmission mechanisms P1, P2, P3 in the transmission direction of the planetary transmission section 3a. The carrier output member 42 of the three output members 41, 42, 43 is comprised of a cylinder shaft disposed on the intermediate side of the triple shaft construction and is coupled to the carrier 123 of the third planetary transmission mechanism P3 to be rotatable in unison therewith. The sun gear output member 43 of the three output members 41, 42, 43 is comprised of a shaft disposed on the innermost side of the triple shaft construction and is formed integral with the rotation support shaft 110 of the sun gear 121 of the third planetary transmission mechanism P3 to be rotatable with the sun gear 121.

The planetary transmission section 3a is constructed such that the drive force of the motor shaft 21 as an engine drive force not subjected to any speed change action by the stepless speed change section 20 is inputted to the ring gear 104 of the first planetary transmission mechanism P1, the output of the motor shaft 22 of the stepless speed change section 20 is inputted to the sun gear 101 of the first planetary transmission mechanism P1, and the engine drive force not subjected to any speed change action by the stepless speed change section 20 and the output of the stepless speed change section 20 are combined/synthesized by the first planetary transmission mechanism P1, the second planetary transmission section P2 and the third planetary transmission mechanism P3, and this combined/synthesized drive force is outputted from the ring gear output member 41, the carrier output member 42 and the sun gear output member 43.

Embodiment 4

Figure 11:
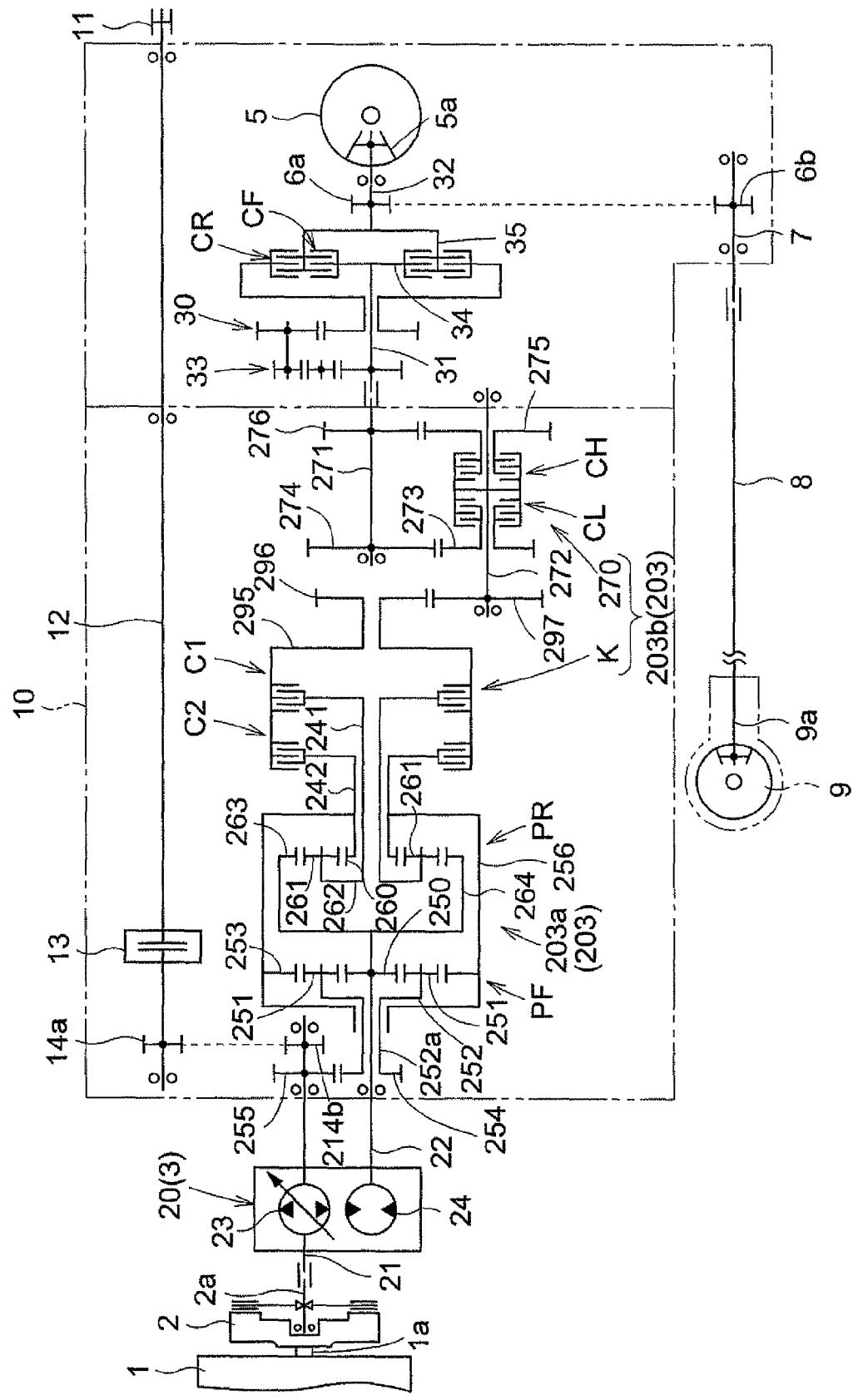
FIG. 11 is a diagram of a traveling transmission apparatus including a speed change transmission apparatus according to Embodiment 4.

FIG. 11 is a diagram showing a speed change transmission apparatus 203 according to Embodiment 4. Here, like members as those in Embodiment 1 are denoted with like reference marks or numerals and will not be explained in repetition basically.

The planetary transmission section 203a includes a pair of planetary transmission mechanisms PF, PR juxtaposed along the fore-and-aft direction of the vehicle body, and a pair of output members 241, 242 disposed rearwardly relative to the vehicle body of the second planetary transmission mechanism PR which is disposed rearwardly relative to the vehicle body of the pair of planetary transmission mechanisms PF, PR, the pair of output members 241, 242 being provided as a double cylindrical shaft construction and rotatable relative to each other.

Of the pair of planetary transmission mechanisms PF, PR, the first planetary transmission mechanism PF which is disposed on the front side relative to the vehicle body includes a sun gear 250 supported to a rear end side of the motor shaft 22, a plurality of planet gears 251 disposed in distribution along the outer periphery of this sun gear 250 and along the peripheral direction of the sun gear 250 and meshed with this sun gear 250, a carrier 252 rotatably supporting the respective planet gears 251 and a ring gear 253 having inner teeth meshed with the respective planet gears 251.

The sun gear 250 is supported to the motor shaft 22 to be rotatable in unison therewith, so that the output from the motor shaft 22 of the stepless speed change section 20 is inputted to the sun gear 250. The carrier 252 is operatively coupled to the rear end side of the pump shaft 21 via a transmission gear 254 which is rotatably mounted to a mounting cylindrical portion 252a of this carrier 252 and a transmission gear 255 meshed with this transmission gear 254. With this, the engine drive force transmitted from the output shaft 1a of the engine 1 to the front end side of the pump shaft 21 and not subjected to any speed change action by the stepless speed change section 20 is transmitted to the carrier 252. The ring gear 253 is operatively coupled via a coupling member 266 to a front end portion of the outer cylindrical shaft side output member 42 of the pair of output members 241, 242 (this will be referred to as the "second output member 242" hereinafter).

Of the pair of planetary transmission mechanisms PF, PR, the second planetary transmission mechanism PR includes a sun gear 260 supported to the front end portion of the second output member 242, a plurality of planet gears 262 disposed in distribution along the outer periphery of this sun gear 260 and along the peripheral direction of the sun gear 260 and meshed with this sun gear 260, a carrier 262 rotatably supporting the respective planet gears 261 and a ring gear 263 having inner teeth meshed with the respective planet gears 261.

The sun gear 260 is supported to the second output member 242 to be rotatable in unison therewith. The sun gear 260 and the second output member 242 are operatively coupled to each other to be rotatable in unison. The carrier 262 is operatively coupled with the front end portion of the inner cylindrical shaft side output member 241 of the pair of output members 241, 242 (this will be referred to as the "first output member 241" hereinafter) to be rotatable in unison therewith. The ring gear 263 is operatively coupled via a coupling member 264 to the sun gear 250 of the first planetary transmission mechanism PF to be rotatable in unison therewith.

That is to say, the engine drive force transmitted from the output shaft 1a of the engine 1 to the carrier 252 without being subjected to any speed change action by the stepless speed change section 20 and the drive force outputted from the motor shaft 22 of the stepless speed change section 20 to the sun gear 250 are combined/synthesized by the first planetary transmission mechanism PF and the second planetary transmission mechanism PR and the resultant combined drive force is outputted from the first output member 241 and the second output member 242.

The speed change output section 203b includes a clutch section K having a first clutch C1 and a second clutch C2, and an auxiliary speed change device 270 operatively coupled to output side rotational members of the first clutch CL1 and the second clutch CL2 via a coupling member 295 and transmission gears 296, 297.

The first clutch C1 includes not only the output side rotational member operatively coupled to the coupling member 295 to be rotatable in unison therewith, but also an input side rotational member coupled to the first output member 241 to be rotatable in unison therewith. The first clutch C1 can be switched over into an engaged condition where the drive force of the first output member 241 is transmitted to the input shaft 272 and a disengaged condition where the transmission from the first output member 241 to the input shaft 272 is broken. The second clutch C2 includes not only the output side rotational member operatively coupled to the coupling member 295 to be rotatable in unison therewith, but also an input side rotational member coupled to the second output member 242 to be rotatable in unison therewith. The second clutch C2 can be switched over into an engaged condition where the drive force of the second output member 242 is transmitted to the input shaft 272 and a disengaged condition where the transmission from the second output member 242 to the input shaft 272 is broken.

The auxiliary speed change device 270 includes, in addition to the input shaft 272 and the output shaft 271, a low speed clutch CL and a high speed clutch CH having input side rotational members operatively coupled to the input shaft 272 to be rotatable in unison therewith, low speed transmission gears 273, 274 operatively coupling an output side rotational member of the low speed clutch CL to the output shaft 271 and high speed transmission gears 275, 276 operatively coupling an output side rotational member of the high speed clutch CH to the output shaft 271

That is, when the low speed clutch CL is operated to the engaged condition and the high speed clutch CH is operated to the disengaged condition, respectively, the auxiliary speed change device 270 enters a low speed condition for transmitting the drive force of the input shaft 272 to the output shaft 271 via the low speed clutch CL and the low speed transmission gears 273, 274. When the low speed clutch CL is operated to the disengaged condition and the high speed clutch CH is operated to the engaged condition, respectively, the auxiliary speed change device 270 enters a high speed condition for transmitting the drive force of the input shaft 272 to the output shaft 271 via the high speed clutch CH and the high speed transmission gears 275, 276.

Figure 13:
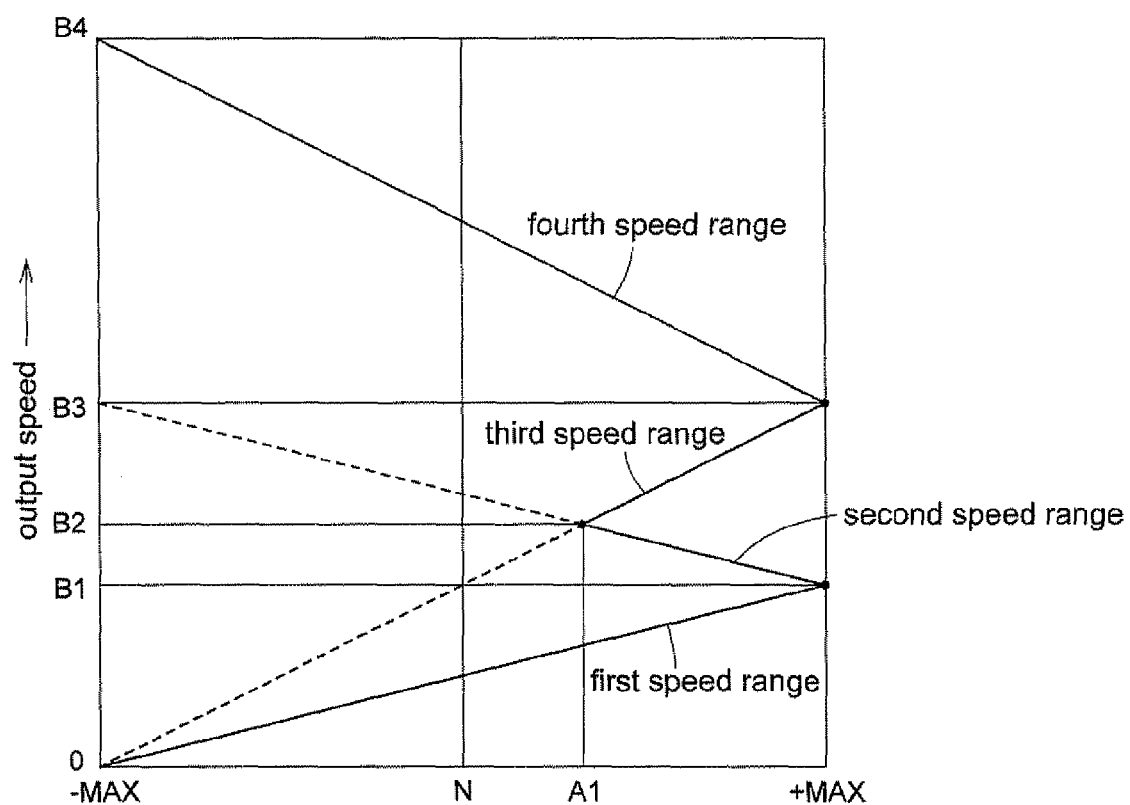
FIG. 13 is an explanatory figure illustrating relationship among speed change conditions of a stepless speed change section, speed ranges of the speed change output section and output speeds in a speed change transmission apparatus according to Embodiment 4.

FIG. 12 is an explanatory view illustrating relationship between operational conditions of the respective clutches C1, C2, CL, CH and speed ranges as operational conditions of the speed change output section 203b. The sign "ENGAGED" shown in FIG. 12 represents the engaged condition of each clutch C1, C2, CL, CH. The sign "−" represents the disengaged condition of each clutch C1, C2, CL, CH. FIG. 13 is an explanatory view illustrating relationship among speed change conditions of the stepless speed change section 20, speed ranges of the speed change output section 203b, and output speeds by the output shaft 271 of the speed change output section 203b. The horizontal axis in FIG. 13 represents the speed change conditions of the stepless speed change section 20 and the vertical axis represents the output speeds by the output shaft 271. The sign "−MAX" on the horizontal axis represents the speed change condition where the output speed by the motor shaft 22 of the stepless speed change section 20 is maximum in the reverse rotation direction. The sign "N" represents the neutral condition of the stepless speed change section 20. The sign "+MAX" on the horizontal axis represents the speed change condition where the output speed by the motor shaft 22 of the stepless speed change section 20 is maximum in the forward rotation direction. The sign "A1" denotes a speed change condition between "N" and "+MAX".

As shown in these figures, when the first clutch C1 and the low speed clutch CH are operated into the engaged condition while the second clutch CL2 and the high speed clutch CH are operated to the disengaged condition, the speed change output section 203b operates such that the combined drive forces outputted from the first output member 241 and the second output member 242 of the planetary transmission section 203a are transmitted in the first speed range by the first clutch C1, the low speed clutch CL and the low speed transmission gears 273, 274 to the output shaft 271 and from this output shaft 271 to the forward/reverse switchover device 30. When the speed change output section 203a is operated as described above, if the stepless speed change section 20 is speed changed from "−MAX" toward "+MAX", then, in association therewith, the output speed of the output shaft 271 is steplessly increased from "0". When the stepless speed change section 20 reaches "+MAX", the output speed of the output shaft 170 becomes "B1".

When the second clutch C2 and the low speed clutch CL are operated into the engaged condition while the first clutch C1 and the high speed clutch CH are operated to the disengaged condition, the speed change output section 203b operates such that the combined drive forces outputted from the first output member 241 and the second output member 242 of the planetary transmission section 203a are transmitted in the second speed range by the second clutch C2, the low speed clutch CL and the low speed transmission gears 273, 274 to the output shaft 271 and from this output shaft 271 to the forward/reverse switchover device 30. When the speed change output section 203b is operated as described above, if the stepless speed change section 20 is decelerated from "+MAX", then, in association therewith, the output speed of the output shaft 271 is steplessly increased from "B1". When the stepless speed change section 20 reaches "A1", the rotational speed of the output shaft 271 becomes "B2".

When the first clutch C1 and the high speed clutch CH are operated into the engaged condition while the second clutch CL2 and the low speed clutch CL are operated to the disengaged condition, the speed change output section 203b operates such that the combined drive forces outputted from the first output member 241 and the second output member 242 of the planetary transmission section 203a are transmitted in the third speed range by the first clutch C1, the high speed clutch CH and the high speed transmission gears 275, 276 to the output shaft 271 and from this output shaft 271 to the forward/reverse switchover device 30. When the speed change output section 203b is operated as described above, if the stepless speed change section 20 is operated from "A1" toward "+MAX", then, in association therewith, the output speed of the output shaft 271 is steplessly increased from "B2". When the stepless speed change section 20 reaches the speed change condition "+MAX", the output speed of the output shaft 271 becomes "B3".

When the second clutch C2 and the high speed clutch CH are operated into the engaged condition while the first clutch C1 and the low speed clutch CL are operated to the disengaged condition, the speed change output section 203b operates such that the combined drive forces outputted from the first output member 241 and the second output member 242 of the planetary transmission section 203a are transmitted in the fourth speed range by the second clutch C2, the high speed clutch CH and the high speed transmission gears 275, 276 to the output shaft 271 and from this output shaft 271 to the forward/reverse switchover device 30. When the speed change output section 203b is operated as described above, if the stepless speed change section 20 is speed changed from "+MAX" toward "−MAX", then, in association therewith, the output speed of the output shaft 271 is steplessly increased from "B3". When the stepless speed change section 20 reaches the speed change condition "−MAX", the output speed of the output shaft 70 becomes the maximum speed "B4".

Figure 14:
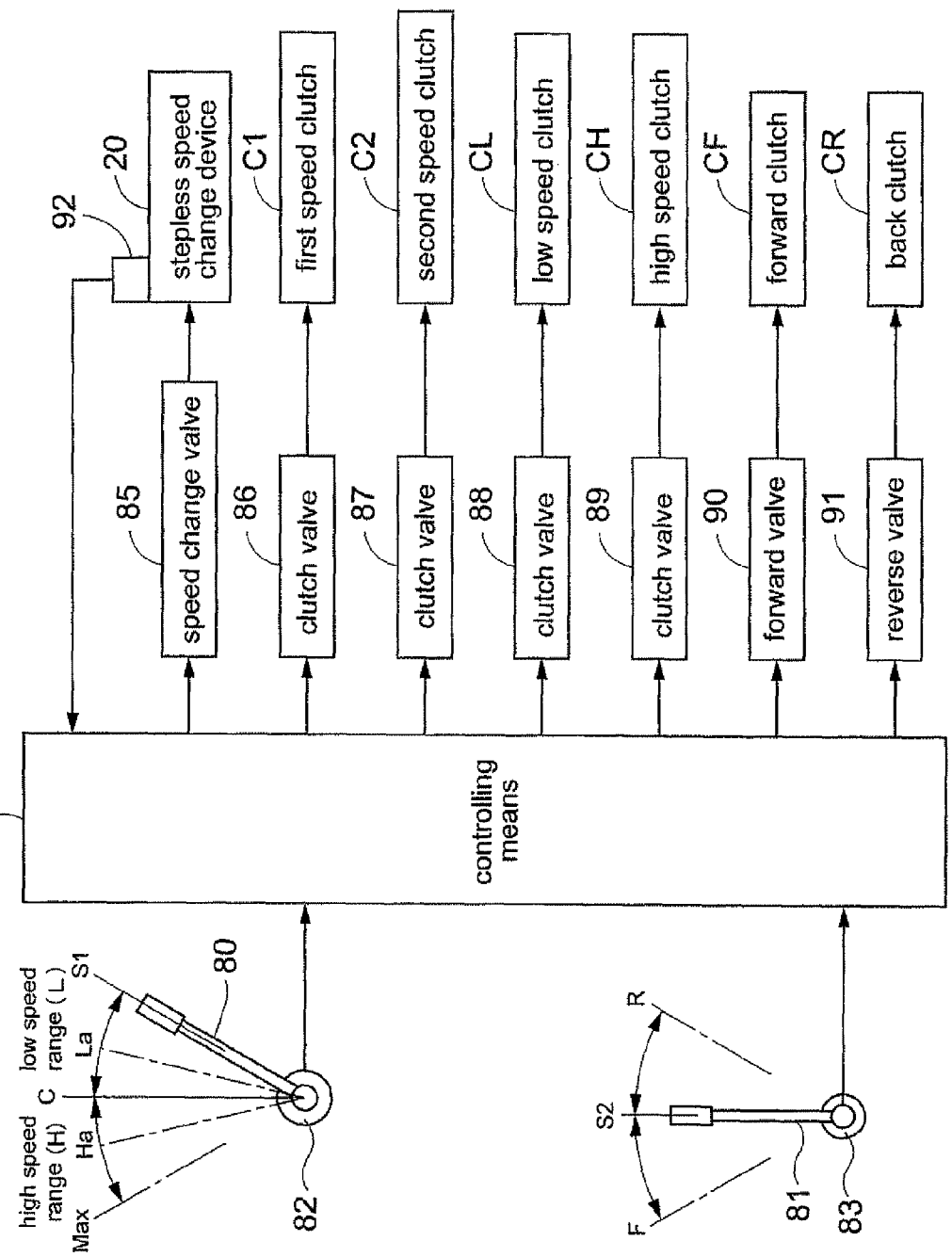
FIG. 14 is a block diagram of a traveling control device.

FIG. 14 is a block diagram of a traveling control apparatus included in a tractor. This traveling control apparatus differs from the traveling control apparatus shown in FIG. 5 only in the respect of the names of the clutches. Therefore, detailed explanation thereof will not be repeated.

Next, operations of the main speed change lever 80 and the graph shown in FIG. 13 will be explained.

After its pivotal operation from the neutral position S1, until the main speed change lever 80 reaches a set position La which is in the low speed range L (this position will be referred to as the low speed set position La hereinafter), the controlling means 84 maintains the first clutch C1 and the low speed clutch under the engaged condition, whereby the speed change transmission apparatus 203 is rendered into the first speed range and effects a speed change operation. Further, as the main speed change lever 80 is pivotally operated from the neutral position S1, the controlling means 84 operates the stepless speed change section 20 from the speed change condition "−MAX" toward the speed change condition "+MAX". With this, in association with the operation of the main speed change lever 80 from the neutral position S1, the output speed of the output shaft 271 is increased steplessly from "0". When the main speed change lever 80 reaches the low speed set position La, the output speed of the output shaft 271 becomes "B1". Under this condition, the controlling means 84 maintains the low speed clutch CL at the engaged condition and switches over the second clutch C2 into the engaged condition, respectively, whereby the speed change transmission apparatus 203 is switched into the second speed range. Thereafter, until the main speed change lever 80 is moved from the low speed set position La to the intermediate position C, the controlling means 84 maintains the second clutch C2 and the low speed clutch under the engaged condition, whereby the speed change transmission apparatus 203 is maintained in the second speed range and effects speed change operation.

Further, as the main speed change lever 80 is pivotally operated from the low speed set position La, the controlling means 84 operates the stepless speed change section 20 from the speed change condition "+MAX" toward the forward rotation speed "A1". With this, in association with the operation of the main speed change lever 80 from the low speed set position La, the output speed of the output shaft 271 is increased steplessly from "B1". When the main speed change lever 80 reaches the intermediate position C, the output speed of the output shaft 271 becomes "B2". Under this condition, the controlling means 84 switches over the first clutch C1 and the high speed clutch CH into the engaged condition, respectively, whereby the speed change transmission apparatus 203 is switched into the third speed range. Thereafter, until the main speed change lever 80 is moved from the intermediate position C to a set position Ha in the high speed range H (this position will be referred to as the high speed set position Ha hereinafter), the controlling means 84 maintains the first clutch C1 and the high speed clutch CH under the engaged condition, whereby the speed change transmission apparatus 203 is rendered into the third speed range and effects speed change operation. Further, as the main speed change lever 80 is pivotally operated from the intermediate position C, the controlling means 84 operates the stepless speed change section 20 from the forward rotation speed "A1" toward "+MAX". With this, in association with the pivotal operation of the main speed change lever 80 from the intermediate position C, the output speed of the output shaft 271 is increased steplessly from "B2". When the main speed change lever 80 reaches the high speed set position Ha, the output speed of the output shaft 271 becomes "B3". Under this condition, the controlling means 84 maintains the high speed clutch CH at the engaged condition and switches over the second clutch C3 into the engaged condition, respectively, whereby the speed change transmission apparatus 203 is switched into the fourth speed range. Thereafter, until the main speed change lever 80 is moved from the high speed set position Ha to reach the maximum speed position Max, the controlling means 84 maintains the second clutch C2 and the high speed clutch CH under the engaged condition, whereby the speed change transmission apparatus 203 is rendered into the fourth speed range and effects speed change operation.

Still further, as the main speed change lever 80 is pivotally operated from the high speed set position Ha, the controlling means 84 operates the stepless speed change device 20 from the speed condition "+MAX" toward "−MAX". With this, in association with the pivotal operation of the main speed change lever 80 from the high speed set position Ha, the output speed by the output shaft 271 is steplessly increased from "B3". When the main speed change lever 80 reaches the maximum speed position Max, the controlling means 84 has maintained the second clutch C2 and the high speed clutch CH under the engaged condition, thus rendering the speed change transmission apparatus 203 in the fourth speed range; and also the controlling means 84 operates the stepless speed change section 20 to the speed change condition "−MAX", whereby the output speed by the output shaft 271 becomes the maximum speed "B4".

In the above-described traveling, if the forward/reverse lever 81 is set to the forward position F, then, the controlling means 84 operates the forward clutch CF to the engaged condition and operates the reverse clutch CR to the disengaged condition, respectively. With this, the forward/reverse switchover device 30 is rendered into the forward traveling condition, so that the output force from the output shaft 271 is converted to the forward drive force and transmitted as such to the rear wheel differential mechanism 5 and the front wheel differential mechanism 9 and the tractor travels forwardly. On the other hand, if the forward/reverse lever 81 is set to the reverse position R, the controlling means 84 operates the forward clutch CF to the disengaged condition and operates the reverse clutch CR to the engaged condition, respectively. With this, the forward/reverse switchover device 30 is rendered into the reverse traveling condition, so that the output force from the output shaft 271 is converted to the reverse drive force and transmitted as such to the rear wheel differential mechanism 5 and the front wheel differential mechanism 9 and the tractor travels reversely.

Incidentally, if the forward/reverse lever 81 is operated to the neutral position S2, the controlling means 84 operates the forward clutch CF and the reverse clutch CR to the disengaged conditions. With this, the power transmission to the rear wheel differential mechanism 5 and the front wheel differential mechanism 9 is stopped and the tractor enters a stop condition.

Embodiment 5

Figure 15:
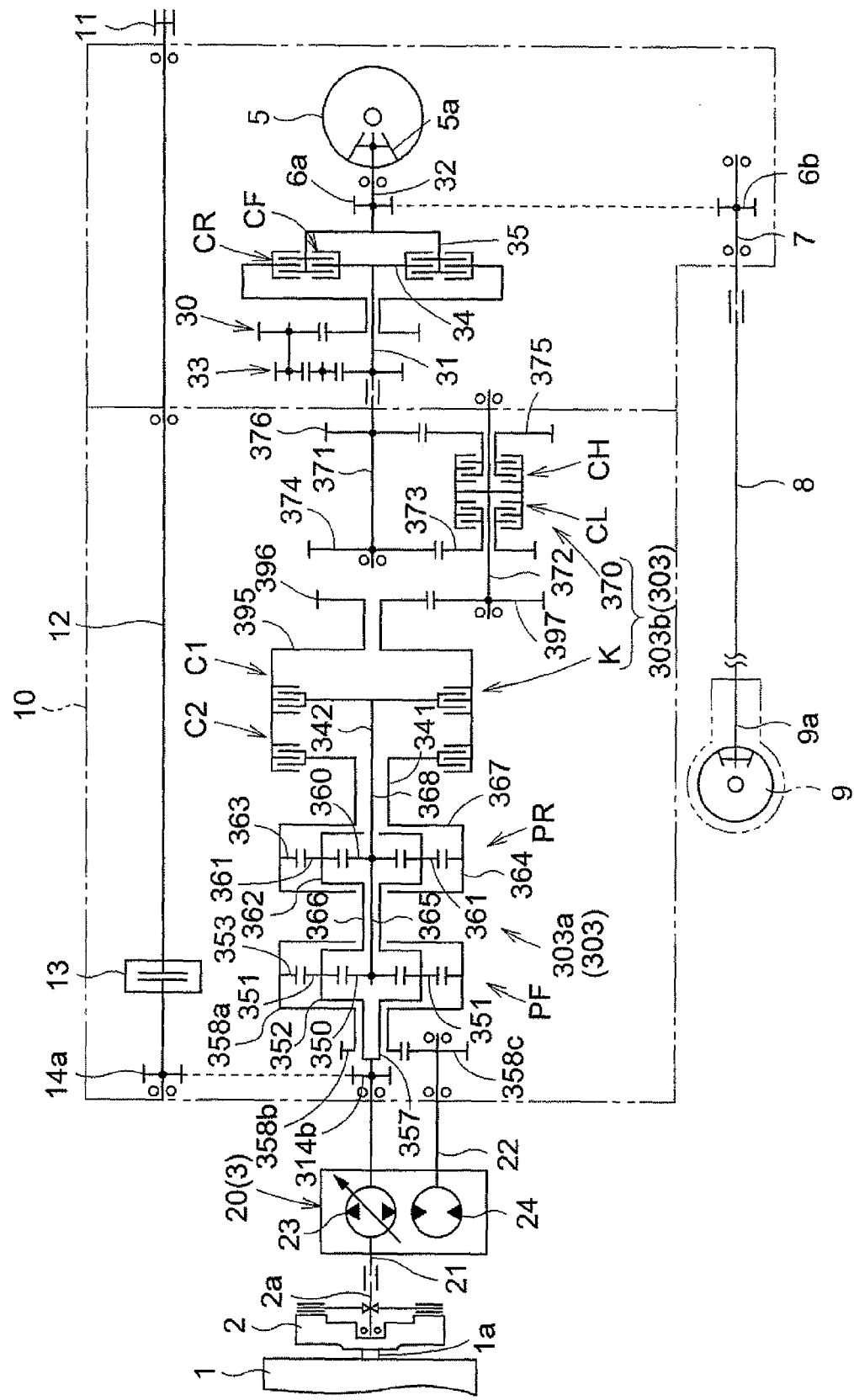
FIG. 15 is a diagram of a traveling transmission apparatus including a speed change transmission apparatus according to Embodiment 5.

FIG. 15 is a diagram of a speed change transmission apparatus 303 according to Embodiment 5. This traveling transmission apparatus includes a main clutch 2 receiving output from an output shaft 1a of an engine 1, the speed change transmission apparatus 303 having an input shaft 21 operatively coupled to an output shaft 2a of the main clutch 2, a forward/reverse switchover device 30 having an input shaft 31 operatively coupled to an output shaft 371 of the speed change transmission apparatus 303, a rear wheel differential mechanism 5 having an input gear 5a operatively coupled to the output shaft 32 of this forward/reverse switchover device 30, a front wheel output shaft 7 operatively coupled, via transmission gears 6a, 6b, to the output shaft 32 of the forward/reverse switchover device 30, and a front wheel differential mechanism 9 having an input shaft 9a operatively coupled, via a transmission shaft 8 to this front wheel output shaft 7.

As shown in FIG. 15, the speed change transmission apparatus 303 includes a hydrostatic stepless speed change section 20 (in the following discussion, this will be referred to as "stepless speed change section 20" for short), having a pump shaft provided as the input shaft 21 (in the following discussion, the input shaft 21 will be referred to as the pump shaft 21), a planetary transmission section 303a having a pair of planetary transmission mechanisms PF, PR, and a speed change output section 303b having the output shaft 371. The speed change output section 303b includes a clutch section K having a first clutch C1 and a second clutch C2 and an auxiliary speed change section 370 having a low speed clutch CL and a high speed clutch CH.

Compared with the speed change transmission apparatus according to Embodiment 4, the speed change transmission apparatus 303 according to Embodiment 5 differs in the arrangement of operatively coupling gears in the planetary transmission section 303a, the arrangement of operatively coupling the clutches C1 and C2 of the clutch section K to the planetary transmission section 303a and the output speeds by the output shaft 371 and has the same constructions as the speed change transmission apparatus according to Embodiment 4 in the other respects.

The gear coupling arrangement in the planetary transmission section 303a, the output arrangement of the planetary transmission section 303a and the output speeds by the output shaft 371 of the speed change transmission apparatus according to Embodiment 5 will be described next.

As shown in FIG. 15, the carrier 352 of the first planetary transmission mechanism PF is operatively coupled via a coupling member 357 to the pump shaft 21 of the stepless speed change section 20 to be rotatable in unison therewith. Hence, the engine drive force transmitted from the output shaft 1a of the the engine 1 to the front end side of the pump shaft 21 and not subjected to any speed change action by the stepless speed change section 20 is inputted to the carrier 352 of the first planetary transmission mechanism PF. The ring gear 353 of the first planetary transmission mechanism PF is operatively coupled to the motor shaft 22 via a coupling member 358a, a transmission gear 358b provided to this coupling member 358a to be rotatable in unison therewith, and a transmission gear 358c meshed with this transmission gear 358b. Hence, the drive force outputted from the motor shaft 22 of the stepless speed change section 20 is inputted to the ring gear 353 of the first planetary transmission mechanism PF. The sun gear 350 of the first planetary transmission mechanism PF and the sun gear 360 of the second planetary transmission mechanism PR are operatively coupled via a rotational shaft 365 to be rotatable in unison with each other. The carrier 352 of the first planetary transmission mechanism PF and the carrier 362 of the second planetary transmission mechanism PR are operatively coupled via a coupling member 366 to be rotatable in unison with each other. The first output member 341 of the planetary transmission section 303a is operatively coupled via a coupling member 367 to the ring gear 363 of the second planetary transmission mechanism PR The second output member 342 of the planetary transmission section 303a is operatively coupled via a rotational shaft 368 to the sun gear 360 of the second planetary transmission mechanism PR to be rotatable in unison with each other.

Figure 16:
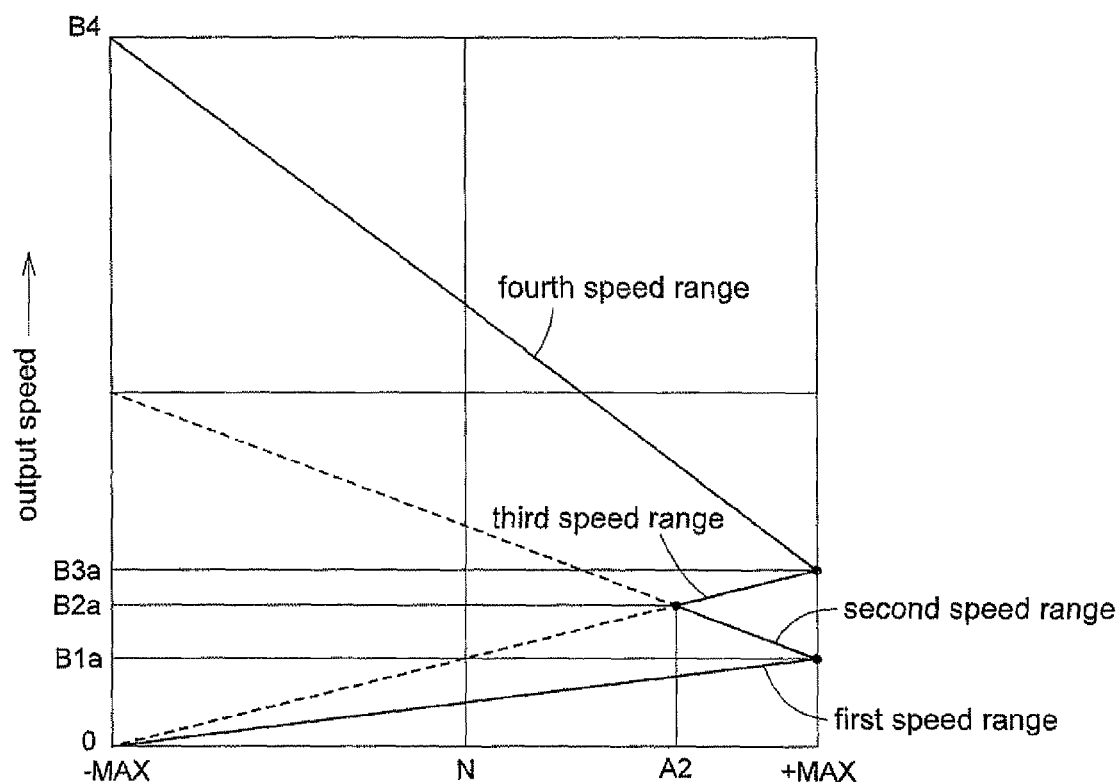
FIG. 16 is an explanatory figure illustrating relationship among speed change conditions of a stepless speed change section, speed ranges of the speed change output section and output speeds in the speed change transmission apparatus according to Embodiment 5.

FIG. 16 is an explanatory figure illustrating relationship among speed change conditions of the hydrostatic stepless speed change section 20, speed ranges of the speed change output section 303b and the output speeds by the output shaft 371 of the speed change output section 303b. The horizontal axis in FIG. 16 shows the speed change conditions of the stepless speed change section 20 and the vertical axis represents the output speeds by the output shaft 371. The sign "−MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. The sign "A2" represents a speed change condition between "N" and "+MAX" of the stepless speed change section 20.

As shown in this figure, when the speed change output section 303b is operated to the first speed range, if the stepless speed change section 20 is operated from "−MAX" toward "+MAX", then, in association therewith, the output speed by the output shaft 371 is increased steplessly from "0". When the stepless speed change section 20 reaches "+MAX", the output speed by the output shaft 371 becomes "B1a". When the speed change output section 303b is operated to the second speed range, if the stepless speed change section 20 is decelerated from "+MAX", then, in association therewith, the output speed by the output shaft 371 is increased steplessly from "B1a". When the stepless speed change section 20 reaches "A2", the output speed by the output shaft 371 becomes "B2a". When the speed change output section 303b is operated to the third speed range, if the stepless speed change section 20 is speed changed from "A2" toward "+MAX", then, in association therewith, the output speed by the output shaft 371 is increased steplessly from "B2a". When the stepless speed change section 20 reaches "+MAX", the output speed by the output shaft 371 becomes "B3a". When the speed change output section 303b is operated to the fourth speed range, if the stepless speed change section 20 is decelerated from "+MAX" toward "−MAX", then, in association therewith, the output speed by the output shaft 371 is increased steplessly from "B3a". When the stepless speed change section 20 reaches "−MAX", the output speed by the output shaft 371 becomes the maximum speed "B4".

Embodiment 6

Figure 17:
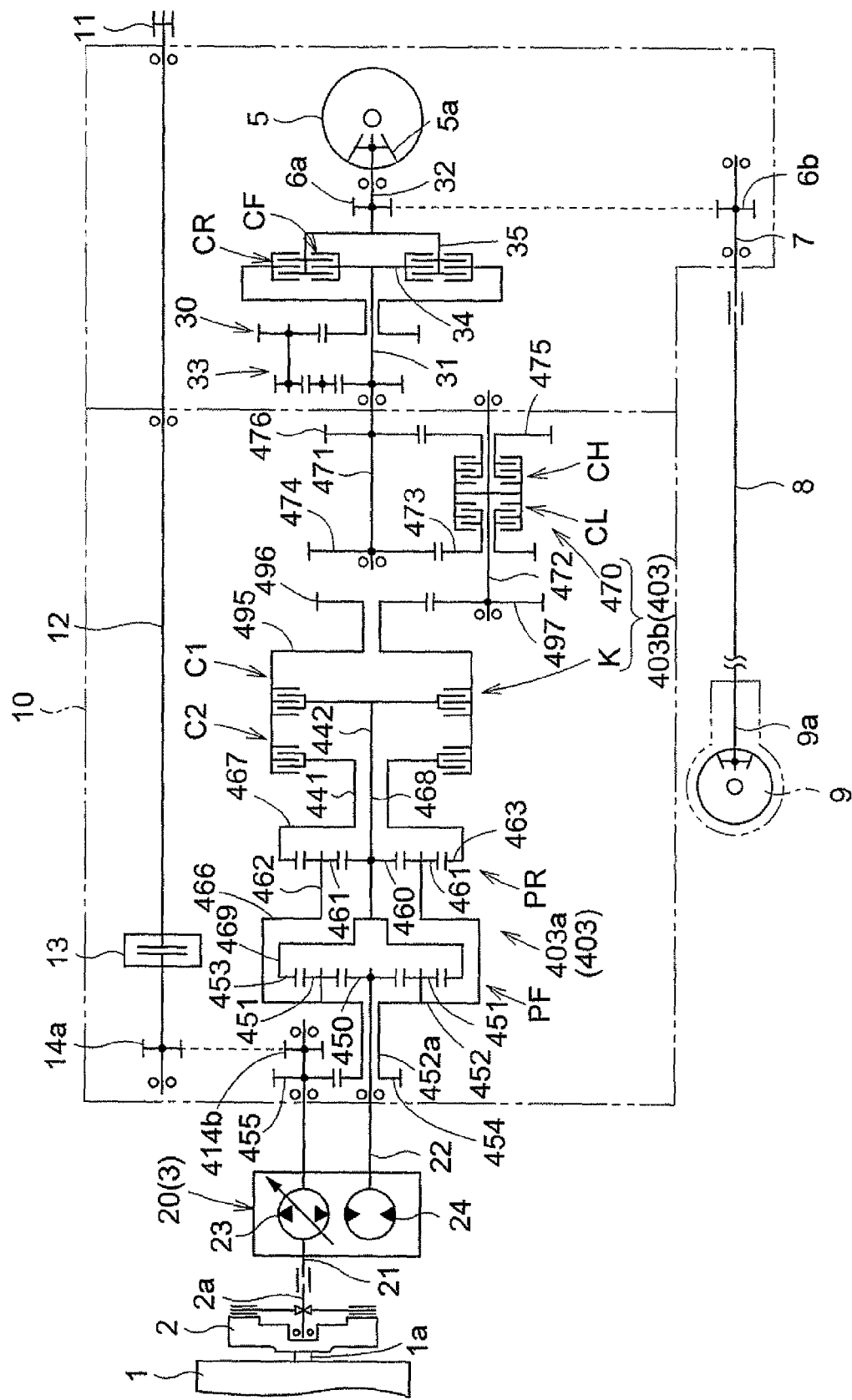
FIG. 17 is a diagram of a traveling transmission apparatus including a speed change transmission apparatus according to Embodiment 6.

FIG. 17 is a diagram of a speed change transmission apparatus 403 according to Embodiment 6. This traveling transmission apparatus includes a main clutch 2 receiving output from an output shaft 1a of an engine 1' the speed change transmission apparatus 403 having an input shaft 21 operatively coupled to an output shaft 2a of the main clutch 2, a forward/reverse switchover device 30 having an input shaft 31 operatively coupled to an output shaft 371 of the speed change transmission apparatus 303, a rear wheel differential mechanism 5 having an input gear 5a operatively coupled to the output shaft 32 of this forward/reverse switchover device 30, a front wheel output shaft 7 operatively coupled, via transmission gears 6a, 6b, to the output shaft 32 of the forward/reverse switchover device 30, and a front wheel differential mechanism 9 having an input shaft 9a operatively coupled, via a transmission shaft 8 to this front wheel output shaft 7.

As shown in FIG. 17, the speed change transmission apparatus 403 includes a hydrostatic stepless speed change section 20 (in the following discussion, this will be referred to as "stepless speed change section 20" for short), having a pump shaft provided as the input shaft 21 (in the following discussion, the input shaft 21 will be referred to as the pump shaft 21), a planetary transmission section 403a having a pair of planetary transmission mechanisms PF, PR, and a speed change output section 403b having an output shaft 471. The speed change output section 403b includes a clutch section K having a first clutch C1 and a second clutch C2 and an auxiliary speed change section 470 having a low speed clutch CL and a high speed clutch CH.

Compared with the speed change transmission apparatus according to Embodiment 4, the speed change transmission apparatus 403 according to Embodiment 6 differs in the arrangement of operatively coupling gears in the planetary transmission section 403a, the arrangement of operatively coupling the clutches C1 and C2 of the clutch section K to the planetary transmission section 403a and the output speeds by the output shaft 471 and has the same constructions as the speed change transmission apparatus according to Embodiment 4 in the other respects.

The gear coupling arrangement in the planetary transmission section 403a, the output arrangement of the planetary transmission section 403a and the output speeds by the output shaft 471 of the speed change transmission apparatus according to Embodiment 6 will be described next.

As shown in FIG. 17, a carrier 452 of the first planetary transmission mechanism PF is operatively coupled to the pump shaft 21 via a transmission gear 454 provided to an attaching cylindrical portion 452a of this carrier 452 to be rotatable therewith and a transmission gear 455 meshed with this transmission gear 454. Hence, the engine drive force transmitted from the output shaft 1a of the engine 1 to the front end side of the pump shaft 21 and not subjected to any speed change action by the stepless speed change section 20 is inputted to the carrier 452 of the first planetary transmission mechanism PF. A sun gear 450 of the first planetary transmission mechanism PF is operatively coupled to the motor shaft 22 of the stepless speed change section 20 to be rotatable in unison therewith. Hence, the drive force outputted from the motor shaft 22 of the stepless speed change section 20 is inputted to the sun gear 450 of the first planetary transmission mechanism PF. A carrier 452 of the first planetary transmission mechanism PF and a carrier 462 of the second planetary transmission mechanism PR are operatively coupled via a coupling member 466 to be rotatable in unison with each other. A ring gear 453 of the first planetary transmission mechanism PF and the sun gear 460 of the second planetary transmission mechanism PR are operatively coupled via a coupling member 469 to be rotatable in unison with each other. A first output member 441 of the planetary transmission section 403a is operatively coupled via a coupling member 467 to the ring gear 463 of the second planetary transmission mechanism PR to be rotatable in unison with each other A second output member 442 of the planetary transmission section 403a is operatively coupled via a rotational shaft 468 to the sun gear 460 of the second planetary transmission mechanism PR to be rotatable in unison with each other.

Figure 18:
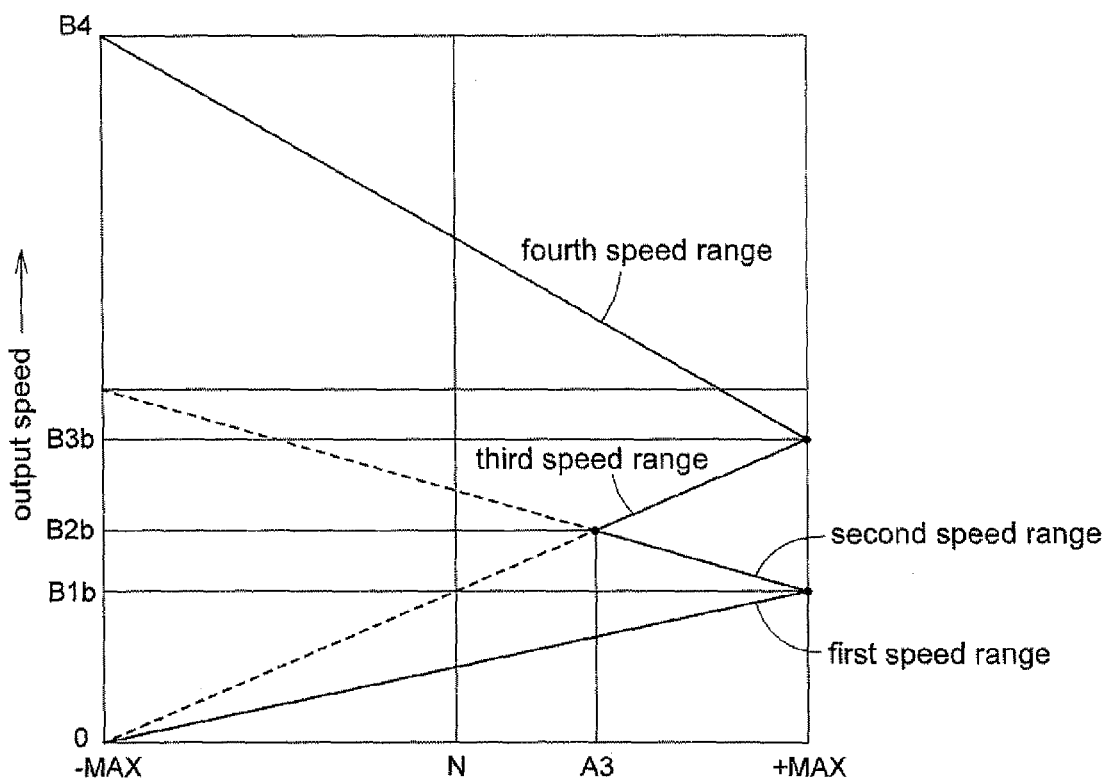
FIG. 18 is an explanatory figure illustrating relationship among speed change conditions of a stepless speed change section, speed ranges of the speed change output section and output speeds in the speed change transmission apparatus according to Embodiment 6.

FIG. 18 is an explanatory figure illustration relationship among speed change conditions of the hydrostatic stepless speed change section 20, speed ranges of the speed change output section 403b and the output speeds by the output shaft 471 of the speed change output section 403b. The horizontal axis in FIG. 18 shows the speed change conditions of the stepless speed change section 20 and the vertical axis represents the output speeds by the output shaft 471. The sign "−MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. The sign "A3" represents a speed change condition between "N" and "+MAX" of the stepless speed change section 20.

As shown in this figure, when the speed change output section 403b is operated to the first speed range, if the stepless speed change section 20 is operated from "−MAX" toward "+MAX", then, in association therewith, the output speed by the output shaft 471 is increased steplessly from "0". When the stepless speed change section 20 reaches "+MAX", the output speed by the output shaft 471 becomes "B1b". When the speed change output section 403b is operated to the second speed range, if the stepless speed change section 20 is decelerated from "+MAX", then, in association therewith, the output speed by the output shaft 471 is increased steplessly from "B1b". When the stepless speed change section 20 reaches "A3", the output speed by the output shaft 471 becomes "B2b". When the speed change output section 403b is operated to the third speed range, if the stepless speed change section 20 is speed changed from "A3" toward "+MAX", then, in association therewith, the output speed by the output shaft 471 is increased steplessly from "B2b". When the stepless speed change section 20 reaches "+MAX", the output speed by the output shaft 471 becomes "B3b". When the speed change output section 403b is operated to the fourth speed range, if the stepless speed change section 20 is speed changed from "+MAX" toward "−MAX", then, in association therewith, the output speed by the output shaft 471 is increased steplessly from "B3b". When the stepless speed change section 20 reaches "−MAX", the output speed by the output shaft 371 becomes the maximum speed "B4".

Embodiment 7

Figure 19:
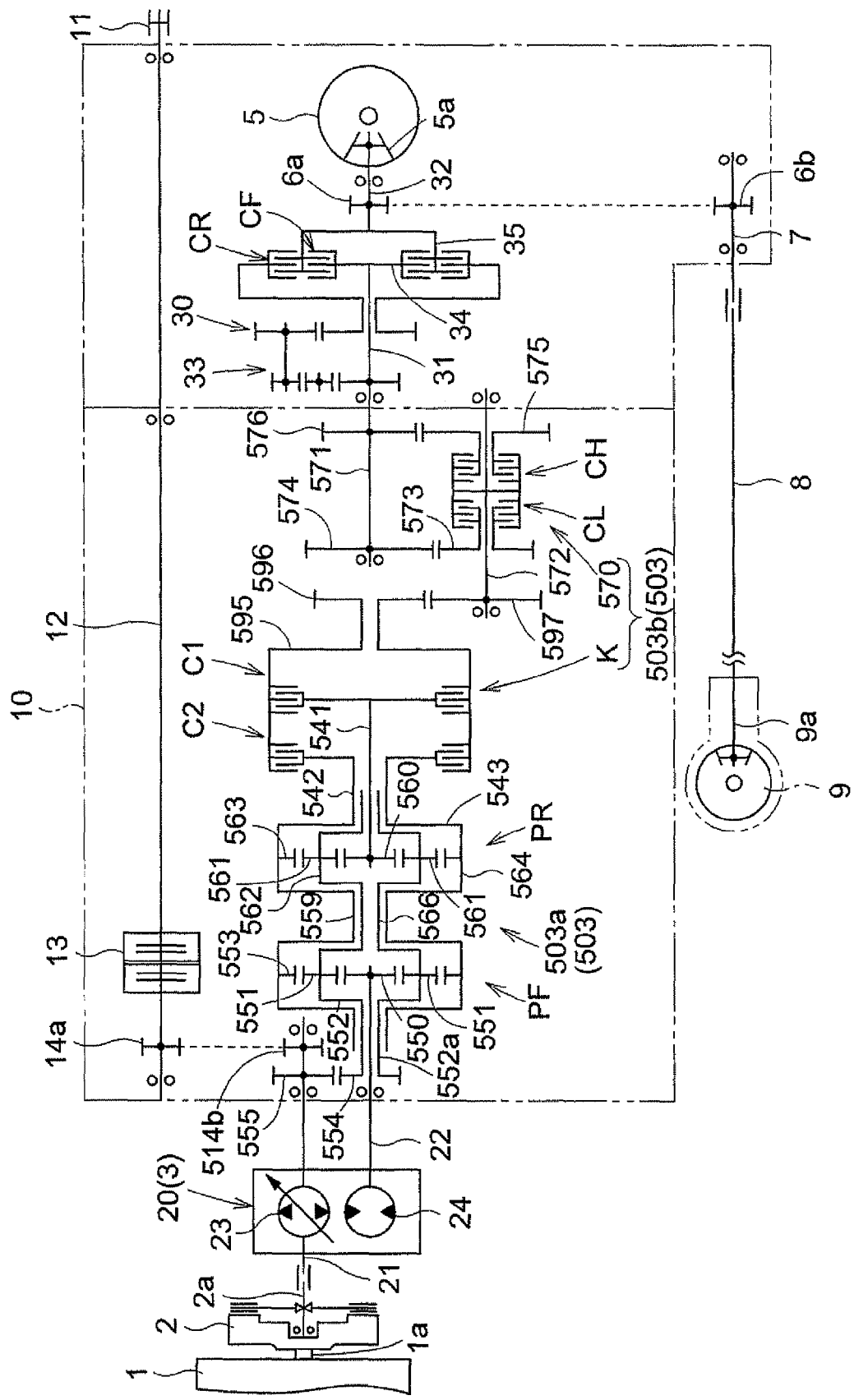
FIG. 19 is a diagram of a traveling transmission apparatus including a speed change transmission apparatus according to Embodiment 7.

FIG. 19 is a diagram of a speed change transmission apparatus 503 according to Embodiment 7. This traveling transmission apparatus includes a main clutch 2 receiving output from an output shaft 1a of an engine 1, the speed change transmission apparatus 503 having an input shaft 21 operatively coupled to an output shaft 2a of the main clutch 2, a forward/reverse switchover device 30 having an input shaft 31 operatively coupled to an output shaft 571 of the speed change transmission apparatus 503, a rear wheel differential mechanism 5 having an input gear 5a operatively coupled to the output shaft 32 of this forward/reverse switchover device 30, a front wheel output shaft 7 operatively coupled, via transmission gears 6a, 6b, to the output shaft 32 of the forward/reverse switchover device 30, and a front wheel differential mechanism 9 having an input shaft 9a operatively coupled, via a transmission shaft 8 to this front wheel output shaft 7.

As shown in FIG. 19, the speed change transmission apparatus 503 includes a hydrostatic stepless speed change section 20 (in the following discussion, this will be referred to as "stepless speed change section 20" for short), having a pump shaft provided as the input shaft 21 (in the following discussion, the input shaft 21 will be referred to as the pump shaft 21), a planetary transmission section 503a having a pair of planetary transmission mechanisms PF, PR, and a speed change output section 503b having the output shaft 571. The speed change output section 503b includes a clutch section K having a first clutch C1 and a second clutch C2 and an auxiliary speed change section 570 having a low speed clutch CL and a high speed clutch CH.

Compared with the speed change transmission apparatus according to Embodiment 4, the speed change transmission apparatus 503 according to Embodiment 7 differs in the arrangement of operatively coupling gears in the planetary transmission section 503a, the arrangement of operatively coupling the clutches C1 and C2 of the clutch section K to the planetary transmission section 503a and the output speeds by the output shaft 571 and has the same constructions as the speed change transmission apparatus according to Embodiment 4 in the other respects.

The gear coupling arrangement in the planetary transmission section 503a, the output arrangement of the planetary transmission section 503a and the output speeds by the output shaft 571 of the speed change transmission apparatus according to Embodiment 7 will be described next.

As shown in FIG. 19, a carrier 552 of the first planetary transmission mechanism PF is operatively coupled to the pump shaft 21 of the stepless speed change section 20 via a transmission gear 554 provided to an attaching cylindrical portion 552a of this carrier 552 to be rotatable therewith and a transmission gear 555 meshed with this transmission gear 554. Hence, the engine drive force transmitted from the output shaft 1a of the engine 1 to the front end side of the pump shaft 21 and not subjected to any speed change action by the stepless speed change section 20 is inputted to the carrier 552 of the first planetary transmission mechanism PF. A sun gear 550 of the first planetary transmission mechanism PF is operatively coupled to the motor shaft 22 of the stepless speed change section 20 to be rotatable in unison therewith. Hence, the drive force outputted from the motor shaft 22 of the stepless speed change section 20 is inputted to the sun gear 550 of the first planetary transmission mechanism PF. A carrier 552 of the first planetary transmission mechanism PF and a carrier 562 of the second planetary transmission mechanism PR are operatively coupled via a coupling member 566 to be rotatable in unison with each other A ring gear 553 of the first planetary transmission mechanism PF and a ring gear 563 of the second planetary transmission mechanism PR are operatively coupled via a coupling member 559 to be rotatable in unison with each other. A first output member 541 of the planetary transmission section 503a is operatively coupled to the sun gear 560 of the second planetary transmission mechanism PR to be rotatable in unison therewith A second output member 542 of the planetary transmission section 503a is operatively coupled via a coupling member 543 to the ring gear 563 of the second planetary transmission mechanism PR to be rotatable in unison with each other.

Figure 20:
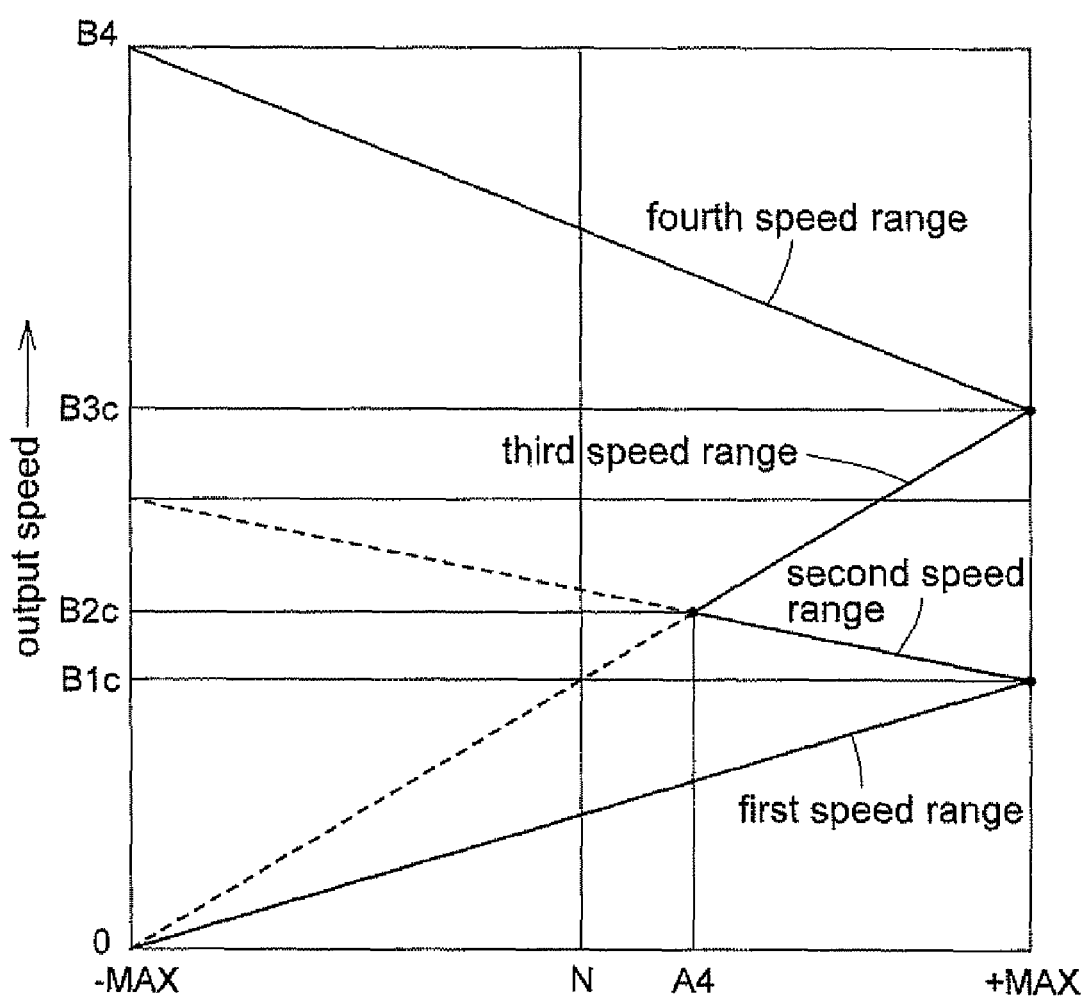
FIG. 20 is an explanatory figure illustrating relationship among speed change conditions of a stepless speed change section, speed ranges of the speed change output section and output speeds in the speed change transmission apparatus according to Embodiment 7.

FIG. 20 is an explanatory figure illustrating relationship among speed change conditions of the hydrostatic stepless speed change section 20, speed ranges of the speed change output section 503b and the output speeds by the output shaft 571 of the speed change output section 503b. The horizontal axis in FIG. 20 shows the speed change conditions of the stepless speed change section 20 and the vertical axis represents the output speeds by the output shaft 571. The sign "−MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. The sign "A4" represents a speed change condition between "N" and "+MAX" of the stepless speed change section 20.

As shown in this figure, when the speed change output section 503b is operated to the first speed range, if the stepless speed change section 20 is operated from "−MAX" toward "+MAX", then, in association therewith, the output speed by the output shaft 571 is increased steplessly from "0". When the stepless speed change section 20 reaches "+MAX", the output speed by the output shaft 571 becomes "B1c". When the speed change output section 503b is operated to the second speed range, if the stepless speed change section 20 is decelerated from "+MAX", then, in association therewith, the output speed by the output shaft 571 is increased steplessly from "B1c". When the stepless speed change section 20 reaches "A4", the output speed by the output shaft 571 becomes "B2c". When the speed change output section 503b is operated to the third speed range, if the stepless speed change section 20 is speed changed from "A4" toward "+MAX", then, in association therewith, the output speed by the output shaft 571 is increased steplessly from "B2c". When the stepless speed change section 20 reaches "+MAX", the output speed by the output shaft 571 becomes "B3c". When the speed change output section 503b is operated to the fourth speed range, if the stepless speed change section 20 is decelerated from "+MAX" toward "−MAX", then, in association therewith, the output speed by the output shaft 571 is increased steplessly from "B3c". When the stepless speed change section 20 reaches "−MAX", the output speed by the output shaft 371 becomes the maximum speed "B4".

Figure 21:
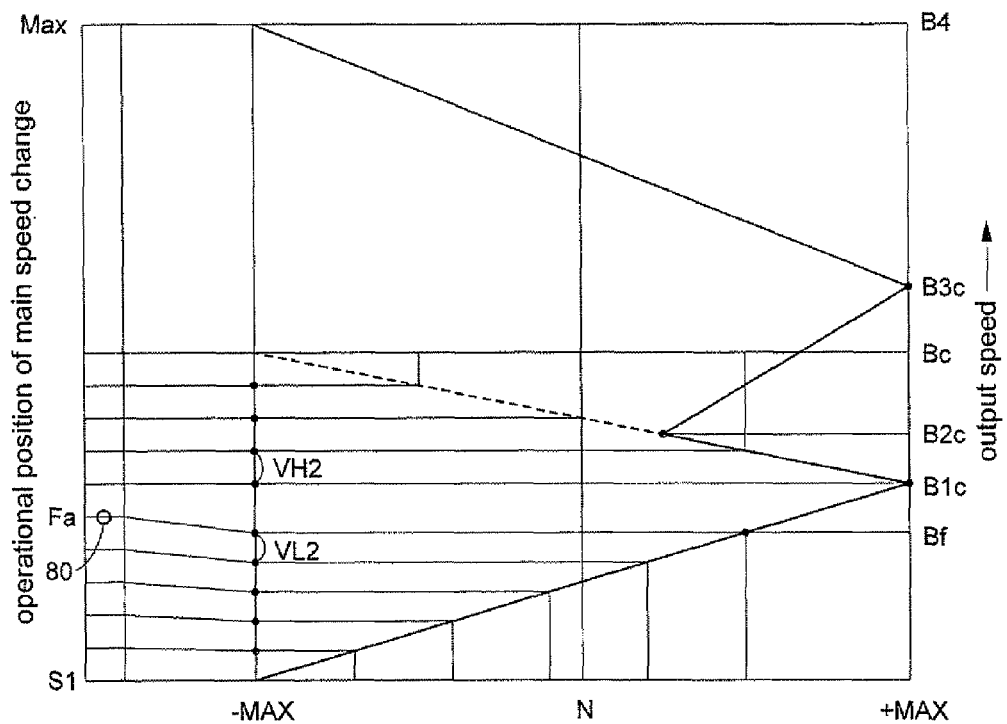
FIG. 21 is an explanatory figure illustrating relationship between operational positions of a main speed change lever and output speeds in the speed change transmission apparatus according to Embodiment 7.

FIG. 21 is an explanatory figure illustrating relationship among operational positions of a main speed change lever 80 of a speed change control device included in the speed change transmission apparatus 503 according to Embodiment 7, speed change conditions of the stepless speed change section 20 which is speed changed by the controlling means 84 based on detection information by speed change detecting means 82 and output speeds by the output shaft 571. The horizontal axis in this figure shows the speed change conditions of the stepless speed change section 20 and the vertical axis represents the output speeds by the output shaft 571. The sign "−MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. An operational position S1 of the main speed change lever 80 shown in this figure is the neutral position. An operational position Fa of the main speed change lever 80 is an operational position where the main speed change lever 80 has been operated from the neutral position S1 by ¼ stroke of its entire operational stroke. An output speed "Bf" of the output shaft 571 shown in this figure is an output speed which is slightly lower than the output speed "B1c".

As shown in this figure, the speed change transmission apparatus 503 according to Embodiment 7 effects speed change operations under a condition with a change in the output speed of the output shaft 571 in response to a change in the speed of the stepless speed change section 20 in the first range is greater than that in the second speed range. However, with the speed change control device included in the speed change transmission apparatus 503 according to Embodiment 7, in case the speed change transmission apparatus 503 enters the first speed range to effect a speed change operation and the output speed by the output shaft 571 is varied between "0" and "B1c" and in case the speed change transmission apparatus 503 enters the second speed range to effect a speed change operation and the output speed by the output shaft 571 is varied between "B1c" and "B2c", the speed change operations can be effected with good operational feel.

Figure 22:
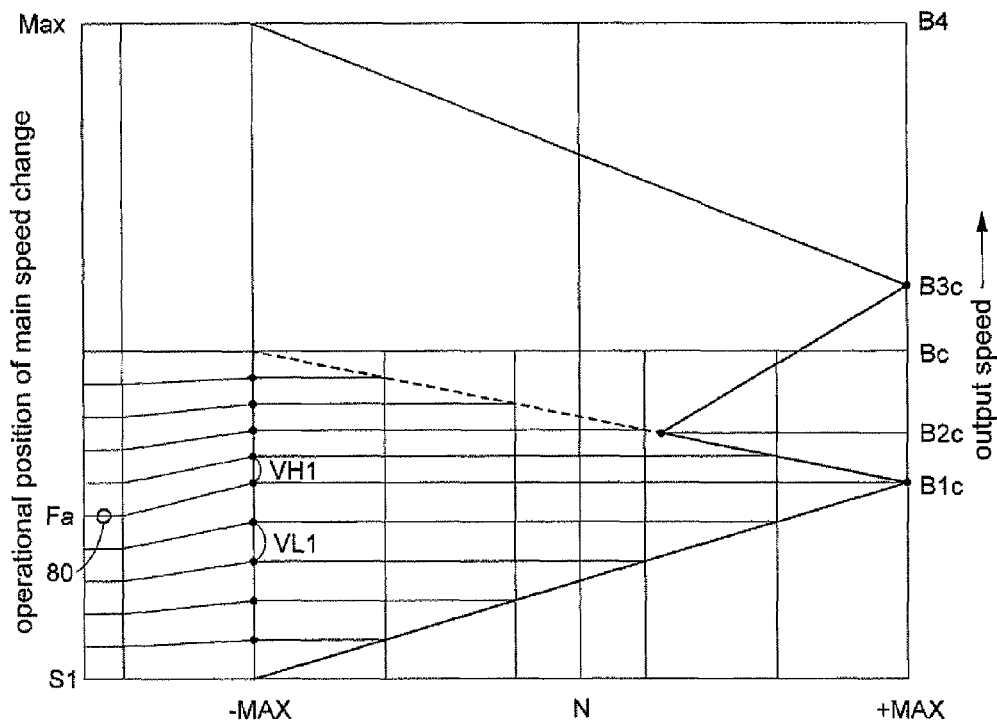
FIG. 22 is an explanatory figure illustrating relationship between operational positions of a main speed change lever and output speeds in a comparison construction.
Figure 24:
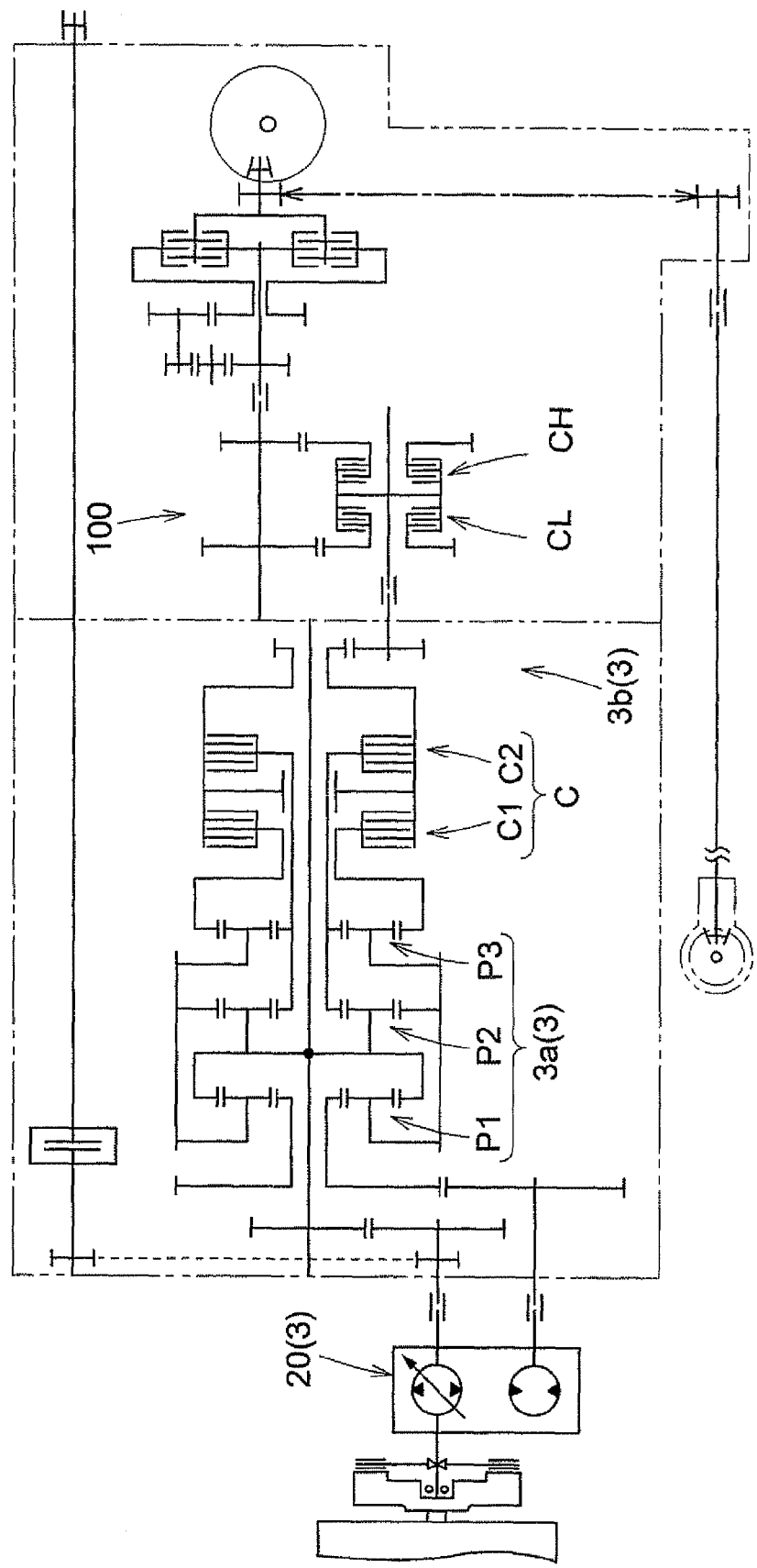
FIG. 24 is a diagram of a speed change transmission apparatus to be compared with the present invention.
Figure 25:
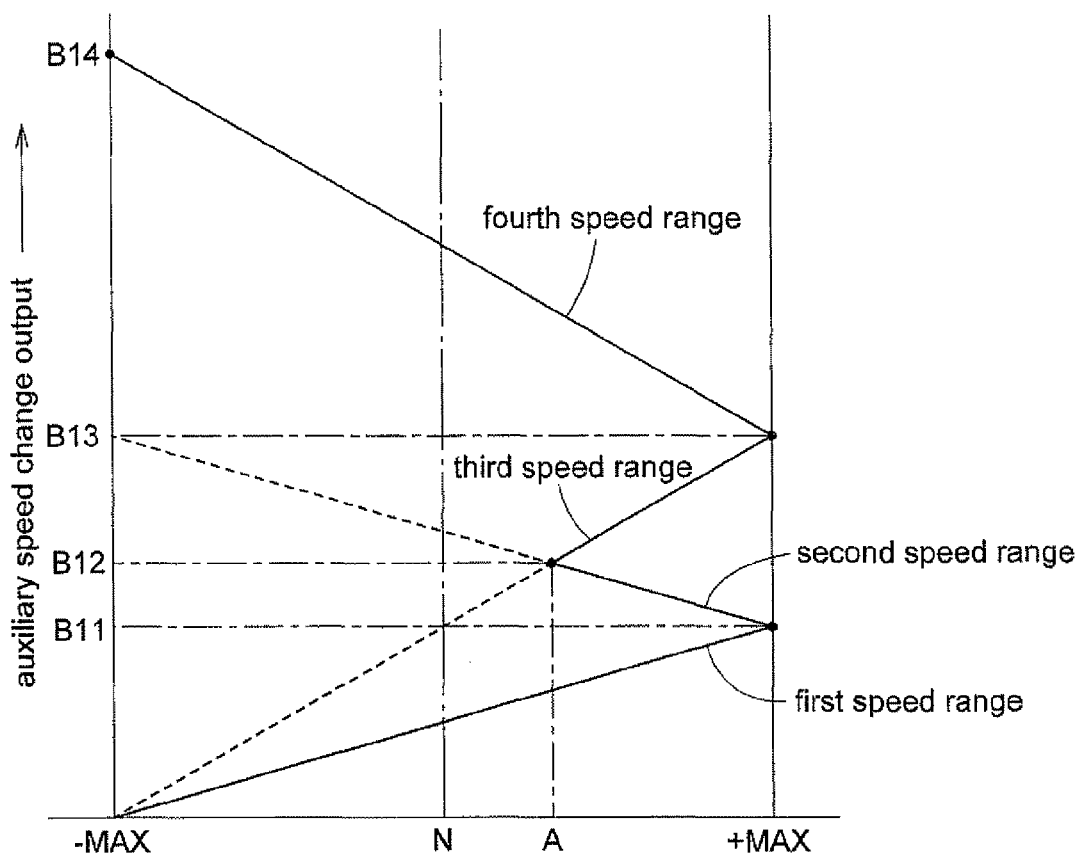
FIG. 25 is an explanatory figure illustrating relationship among speed change conditions of a stepless speed change section, speed ranges of the speed change output section and output speeds in the speed change transmission apparatus to be compared with the present invention.

That is, FIG. 22 is an explanatory figure showing relationship among operational positions of a main speed change lever 80 of a speed change control device to be compared with the speed change control device included in the speed change transmission apparatus 503 according to Embodiment 7, speed change conditions of the stepless speed change section 20 and output speeds by the output shaft 571. The horizontal axis in this figure shows the speed change conditions of the stepless speed change section 20 and the vertical axis represents the output speeds by the output shaft 571. The sign "−MAX" on the horizontal axis represents the speed change condition when the output speed by the motor shaft 22 of the stepless speed change section 20 is at the highest speed in the reverse rotation direction. The sign "N" represents the neutral condition of the stepless speed change section 20. The sign "+MAX" on the horizontal axis represents the speed change condition when the output speed by the motor shaft 22 of the stepless speed change section 20 is at the highest speed in the forward rotation direction. The operational position S1 of the main speed change lever 80 shown in this figure is the neutral position. The operational position Fa of the main speed change lever 80 is an operational position where the main speed change lever 80 has been operated from the neutral position S1 by ¼ stroke of its entire operational stroke.

As shown in FIG. 21, with the speed change control device included in the speed change transmission apparatus 503 according to Embodiment 7, if the main speed change lever 80 is operated to the operational position Fa, in response to a speed change operation of the stepless speed change section 20 by the controlling means 84, the output speed by the output shaft 571 becomes "Bf". As shown in FIG. 22, with the speed change control device for comparison, when the main speed change lever 80 is operated to the operational position Fa, the output speed by the output shaft 571 becomes "B1c". For this reason, as shown in FIG. 22, in the case of the speed change control device for comparison, there occurs a large difference between a magnitude VL1 of output speed change occurring when the main speed change lever 80 is operated by a standard stroke operation on the lower speed side than the operational position Fa and a magnitude VH1 of output speed change occurring when the main speed change lever 80 is operated by the standard stroke operation on the higher speed side than the operational position Fa and in the second speed range. On the other hand, as shown in FIG. 21, in the case of the speed change control device according to Embodiment 7, there occurs a smaller difference a magnitude VL2 of output speed change occurring when the main speed change lever 80 is operated by the standard stroke operation on the lower speed side than the operational position Fa and a magnitude VH2 of output speed change occurring when the main speed change lever 80 is operated by the standard stroke operation on the higher speed side than the operational position Fa and in the second speed range.

FIG. 23 is an explanatory view illustrating characteristics of the speed change transmission apparatuses 203-503 according to the above-described Embodiments 4-7. The outputs shown in this figure indicate from which of the sun gears 260-560, the carriers 262-254 and the ring gears 263-563 of the second planetary transmission mechanism PR in the respective one of the four speed ranges the output is provided. The acceleration indicates result of comparison between the first speed range and the second speed range of the output speed changes by the output shafts 271-571 in response to speed changes of the stepless speed change section 20. The gear load shows under which of three stages of high, middle and low the ratio (load ratio) between the load of the gear (sun gear, planet gear, ring gear) receiving the maximum load and the load of the gear (sun gear, planet gear, ring gear) receiving the minimum load in the planetary transmission mechanisms PF, PR is classified The transmission efficiency shows under which of three stages of high, middle and low the efficiency of conversion of the engine drive force not subjected to any speed change action by the stepless speed change section 20 into the output by the output shafts 271-251 is classified. The higher this transmission efficiency, the smaller the capacity the stepless speed change section 20 may have.

As shown in this figure, in the case of the speed change transmission apparatus 203 according to Embodiment 4, in the first speed and third speed ranges, the force is outputted from the carrier 262 of the second planetary transmission mechanism PR and in the second and fourth speed ranges, the force is outputted from the sun gear of the rear planetary transmission mechanism PR. In the first speed range and the second speed range, the acceleration is the same. In the third speed range and the fourth speed range, the acceleration is the same. The gear load and the transmission efficiency are intermediate.

In the case of the speed change transmission apparatus 303 according to Embodiment 5, in the first speed and third speed ranges, the force is outputted from the ring gear 363 of the second planetary transmission mechanism PR and in the second and fourth speed ranges, the force is outputted from the sun gear 360 of the second planetary transmission mechanism PR. The acceleration is higher in the second speed range than in the first speed range and higher in the fourth speed range than in the third speed range, respectively. The gear load is small and the transmission efficiency is low.

In the case of the speed change transmission apparatus 403 according to Embodiment 6, in the first speed and third speed ranges, the force is outputted from the ring gear 463 of the second planetary transmission mechanism PR and in the second and fourth speed ranges, the force is outputted from the sun gear 460 of the second planetary transmission mechanism PR. The acceleration is higher in the second speed range than in the first speed range and higher in the fourth speed range than in the third speed range, respectively. The gear load and the transmission efficiency are intermediate.

In the case of the speed change transmission apparatus 503 according to Embodiment 7, in the first speed and third speed ranges, the force is outputted from the sun gear 560 of the second planetary transmission mechanism PR and in the second and fourth speed ranges, the force is outputted from the ring gear 563 of the second planetary transmission mechanism PR. The acceleration is higher in the first speed range than in the second speed range and higher in the third speed range than in the fourth speed range, respectively.

Embodiment 8

Instead of the speed change transmission apparatuses according to the respective embodiments described above, the present invention may be applied to a speed change transmission apparatus configured such that the force is provided in four or less separate speed ranges or four or more separate speed ranges, such as a speed change transmission apparatus including three transmission mechanisms provided between/across a plurality of output members of a planetary transmission section and an output shaft of a speed change output section and three clutches provided respectively in these three transmission mechanisms and configured such that an engine output is provided in three separate speed ranges and each one of the first through three speed ranges, the force is speed changed steplessly and outputted as such or a speed change transmission apparatus including five transmission mechanisms provided between/across a plurality of output members of a planetary transmission section and an output shaft of a speed change output section and five clutches provided respectively in these five transmission mechanisms and configured such that an engine output is provided in five separate speed ranges and each one of the first through fifth speed ranges, the force is speed changed steplessly and outputted as such.

Instead of the clutches CL1 through CL4 shown in the respective embodiments described above, it is possible to employ clutches utilizing synchromesh arrangement and switched over between an engaged condition and a disengaged condition by a shift operation of a clutch gear. In this case too, the object of the present invention can be achieved.

INDUSTRIAL APPLICABILITY

The speed change transmission apparatus according to the present invention may be used in a work vehicle such as a tractor.

What is claimed is:

1. A speed change transmission apparatus comprising:
a hydrostatic stepless speed change section having a hydraulic pump and a hydraulic motor and receiving an output of an engine via a pump shaft;
a planetary transmission section having a plurality of planetary transmission mechanisms and a plurality of output members, the planetary transmission section being configured to combine a drive force outputted from the hydrostatic stepless speed change section and an engine drive force that has not been subjected to any speed change action by the hydrostatic stepless speed change section; and
a speed change output section having a single output shaft, the speed change output section being configured to output combined drives force outputted from the plurality of output members in a plurality of different speed ranges from the output shaft;
wherein the engine, the hydrostatic stepless speed change section, and the planetary transmission section are provided in the stated sequence from an upstream side in a drive force transmitting direction;
wherein a power takeoff shaft is operatively coupled with the pump shaft which extends through the hydraulic pump, and the engine drive force that has not been subjected to any speed change action by the hydrostatic stepless speed change section is transmitted to said planetary transmission section via the power takeoff shaft;
wherein said speed change output section includes a plurality of transmission mechanisms disposed between said plurality of output members and said output shaft, and a clutch provided for each of the plurality of transmission mechanisms; and
each of the plurality of transmission mechanisms includes an input gear provided at the output member associated therewith, and an output gear mounted on the single output shaft and meshed with the input gear.

2. The speed change transmission apparatus according to claim 1, output side rotational members of the clutches are supported on the output shaft of the speed change output section to be rotatable therewith.

3. The speed change transmission apparatus according to claim 1, wherein each one of the clutches is a multiple disc type friction clutch.

4. The speed change transmission apparatus according to claim 1, wherein each one of the plurality of transmission mechanisms includes a pair of gears meshing with each other.

5. The speed change transmission apparatus according to claim 1, wherein said plurality of output members of the planetary transmission section includes a sun gear output member rotatable in unison with a sun gear of the planetary transmission mechanism which is disposed on the most downstream side in the transmission direction of the planetary transmission section, a carrier output member rotatable in unison with a carrier of said most downstream side planetary transmission mechanism, and a ring gear output member rotatable in unison with a ring gear of said most downstream side planetary transmission mechanism.

6. The speed change transmission apparatus according to claim 5, wherein the sun gear output member, the carrier output member and the ring gear output member are configured as a triple shaft construction parallel to the rotational axis of the output shaft; and the plurality of transmission mechanisms are arranged along the direction of the rotational axis of the output shaft.

7. A speed change transmission apparatus comprising:
a hydrostatic stepless speed change section having a hydraulic pump and a hydraulic motor and receiving an output of an engine via a pump shaft;
a planetary transmission section having a pair of output members, the planetary transmission section being configured to combine a drive force outputted from the hydrostatic stepless speed change section and an engine drive force that has not been subjected to any speed change action by the hydrostatic stepless speed change section and to output the combined force from said pair of output members; and
a speed change output section configured to output combined drives force outputted from the pair of output members in a plurality of speed ranges;
said planetary transmission section including:
a first planetary transmission mechanism having a first sun gear, a first ring gear and a first carrier and configured to receive the output from said hydrostatic stepless speed change section and the engine drive force that has not been subjected to any speed change action by the hydrostatic stepless speed change section; and
a second planetary transmission mechanism having a second sun gear, a second ring gear and a second carrier and configured to receive output from said first planetary transmission mechanism;
wherein said second sun gear of said second planetary transmission mechanism is operatively coupled to one of said pair of output members and either one of said second carrier and said second ring gear of said second planetary transmission mechanism is operatively coupled to the other of said pair of output members;
a power takeoff shaft operatively coupled with the pump shaft which extends through the hydraulic pump.

8. The speed change transmission apparatus according to claim 7, wherein the output from the hydrostatic stepless change speed section is inputted to the first sun gear of the first planetary transmission mechanism and the engine drive force that has not been subjected to any speed change action by the hydrostatic stepless speed change section is inputted to the first carrier;
the second ring gear of the second planetary transmission mechanism is operatively coupled to the first sun gear of the first planetary transmission mechanism to be rotatable in unison therewith, the second sun gear is operatively coupled to the first ring gear of the first planetary transmission mechanism to be rotatable in unison therewith; and
the second carrier of the second planetary transmission mechanism is operatively coupled to the other of the pair of output members.

9. The speed change transmission apparatus according to claim 7, wherein the output from the hydrostatic stepless change speed section is inputted to the first ring gear of the first planetary transmission mechanism and the engine drive force that has not been subjected to any speed change action by the hydrostatic stepless speed change section is inputted to the first carrier;

the second sun gear of the second planetary transmission mechanism is operatively coupled to the first sun gear of the first planetary transmission mechanism to be rotatable in unison therewith, the second carrier is operatively coupled to the first carrier of the first planetary transmission mechanism to be rotatable in unison therewith; and the second ring gear of the second planetary transmission mechanism is operatively coupled to the other of the pair of output members.

10. The speed change transmission apparatus according to claim 7, wherein the output from the hydrostatic stepless change speed section is inputted to the first sun gear of the first planetary transmission mechanism and the engine drive force that has not been subjected to any speed change action by the hydrostatic stepless speed change section is inputted to the first carrier;

the second carrier of the second planetary transmission mechanism is operatively coupled to the first carrier of the first planetary transmission mechanism to be rotatable in unison therewith, the second sun gear is operatively coupled to the first ring gear of the first planetary transmission mechanism to be rotatable in unison therewith; and the second ring gear of the second planetary transmission mechanism is operatively coupled to the other of the pair of output members.

11. The speed change transmission apparatus according to claim 7, wherein the output from the hydrostatic stepless change speed section is inputted to the first sun gear of the first planetary transmission mechanism and the engine drive force that has not been subjected to any speed change action by the hydrostatic stepless speed change section is inputted to the first carrier;

the second carrier of the second planetary transmission mechanism is operatively coupled to the first carrier of the first planetary transmission mechanism to be rotatable in unison therewith, the second ring gear is operatively coupled to the first ring gear of the first planetary transmission mechanism to be rotatable in unison therewith; and the second ring gear of the second planetary transmission mechanism is operatively coupled to the other of the pair of output members.

12. The speed change transmission apparatus according to claim 7, wherein said pair of output members include a shaft and a cylindrical shaft through which said shaft extends.

13. The speed change transmission apparatus according to claim 8, wherein said pair of output members include a shaft and a cylindrical shaft through which said shaft extends.

14. The speed change transmission apparatus according to claim 9, wherein said pair of output members include a shaft and a cylindrical shaft through which said shaft extends.

15. The speed change transmission apparatus according to claim 10, wherein said pair of output members include a shaft and a cylindrical shaft through which said shaft extends.

16. The speed change transmission apparatus according to claim 11, wherein said pair of output members include a shaft and a cylindrical shaft through which said shaft extends.

* * * * *